US012681973B1

(12) United States Patent
Shah et al.

(10) Patent No.: US 12,681,973 B1
(45) Date of Patent: Jul. 14, 2026

(54) AGREEMENT RENEWAL FRAMEWORK

(71) Applicant: DocuSign, Inc., San Francisco, CA (US)

(72) Inventors: Hiral Shah, Palo Alto, CA (US); Shaheen Umer, Menlo Park, CA (US); Ramachandra Kota, Kirkland, WA (US); Shubham Gupta, Sunnyvale, CA (US); Dipam Haresh Vasani, San Francisco, CA (US); Shreeya Singh Dhakal, Bothell, WA (US); Cong Minh Phan, Renton, WA (US); Ashwath Saran Mohan, San Ramon, CA (US); Joshua Katowitz, San Diego, CA (US); Anthony Shalagin, Jersey City, NJ (US); Celine Beck, Montreal (CA); Jennifer Park, New York, NY (US)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/678,937

(22) Filed: May 30, 2024

(51) Int. Cl.
| | |
|---|---|
| *G06F 16/30* | (2019.01) |
| *G06F 16/334* | (2025.01) |
| *G06F 16/338* | (2019.01) |
| *G06F 30/27* | (2020.01) |
| *G06F 40/166* | (2020.01) |
| *G06Q 50/18* | (2012.01) |
| *G06F 16/16* | (2019.01) |

(52) U.S. Cl.
CPC ........ *G06F 16/338* (2019.01); *G06F 16/3344* (2019.01); *G06F 30/27* (2020.01); *G06F 40/166* (2020.01); *G06Q 50/18* (2013.01); *G06F 16/168* (2019.01)

(58) Field of Classification Search
CPC .. G06F 16/168; G06F 16/3344; G06F 16/338; G06F 30/27; G06F 40/166; G06Q 50/18
See application file for complete search history.

(56) References Cited

U.S. PATENT DOCUMENTS

| | | | |
|---|---|---|---|
| 2023/0385541 A1* | 11/2023 | Ben Shahar | G06F 40/20 |
| 2024/0257036 A1* | 8/2024 | Bobrova | H04L 67/306 |
| 2024/0273286 A1* | 8/2024 | Lu | G06Q 10/101 |
| 2025/0005300 A1* | 1/2025 | O'Kelly | G06F 40/40 |

* cited by examiner

*Primary Examiner* — Diedra McQuitery
(74) *Attorney, Agent, or Firm* — KDW FIRM PLLC

(57) ABSTRACT

A method, a system, and a computer program product for determining renewal of agreement documents. A first machine learning model is used to generate one or more portions of a document. Each portion of the document is associated with a predetermined subject. A query is generated using the predetermined subject. The query and one or more definitions of one or more attributes are provided to a second machine learning model. At least one attribute and a value assigned to the attribute are received from the second machine learning model. The value is extracted from one or more portions and assigned to the attribute. A graphical user interface displaying the attribute and the value assigned to the attribute is generated.

9 Claims, 19 Drawing Sheets

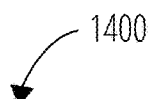

1400

GENERATE, USING A FIRST MACHINE LEARNING MODEL, ONE OR MORE PORTIONS OF A DOCUMENT, EACH PORTION IN ONE OR MORE PORTIONS OF THE DOCUMENT BEING ASSOCIATED WITH A PREDETERMINED SUBJECT 1402

GENERATE A QUERY USING THE PREDETERMINED SUBJECT 1404

PROVIDE THE QUERY AND ONE OR MORE DEFINITIONS OF ONE OR MORE ATTRIBUTES TO A SECOND MACHINE LEARNING MODEL 1406

RECEIVE, FROM THE SECOND MACHINE LEARNING MODEL, AT LEAST ONE ATTRIBUTE IN ONE OR MORE ATTRIBUTES AND A VALUE ASSIGNED TO AT LEAST ONE ATTRIBUTE 1408

GENERATE A GRAPHICAL USER INTERFACE DISPLAYING AT LEAST ONE ATTRIBUTE AND THE VALUE ASSIGNED TO AT LEAST ONE ATTRIBUTE 1410

FIG. 14

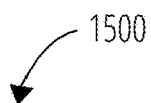

1500

RECEIVE A DOCUMENT HAVING A PLURALITY OF PORTIONS 1502

EXTRACT, USING A FIRST MACHINE LEARNING MODEL, ONE OR MORE PORTIONS IN THE PLURALITY OF PORTIONS FROM THE DOCUMENT, EACH PORTION IN ONE OR MORE PORTIONS IS ASSOCIATED WITH A PREDETERMINED SUBJECT 1504

PROVIDE A QUERY AND ONE OR MORE DEFINITIONS OF ONE OR MORE ATTRIBUTES ASSOCIATED WITH THE PREDETERMINED SUBJECT TO A SECOND MACHINE LEARNING MODEL 1506

RECEIVE, FROM THE SECOND MACHINE LEARNING MODEL, AT LEAST ONE ATTRIBUTE IN ONE OR MORE ATTRIBUTES AND A VALUE ASSIGNED TO AT LEAST ONE ATTRIBUTE 1508

GENERATE A GRAPHICAL USER INTERFACE DISPLAYING AT LEAST ONE ATTRIBUTE AND THE VALUE ASSIGNED TO AT LEAST ONE ATTRIBUTE 1510

FIG. 15

1600

EXTRACT, USING A FIRST MACHINE LEARNING MODEL, ONE OR MORE PORTIONS IN THE PLURALITY OF PORTIONS FROM A DOCUMENT, EACH PORTION IN ONE OR MORE PORTIONS IS ASSOCIATED WITH A PREDETERMINED SUBJECT 1602

PROVIDE A QUERY AND ONE OR MORE DEFINITIONS OF ONE OR MORE ATTRIBUTES ASSOCIATED WITH THE PREDETERMINED SUBJECT TO A SECOND MACHINE LEARNING MODEL 1604

RECEIVE, FROM THE SECOND MACHINE LEARNING MODEL, AT LEAST ONE ATTRIBUTE IN ONE OR MORE ATTRIBUTE AND A VALUE ASSIGNED TO AT LEAST ONE ATTRIBUTE 1606

GENERATE A GRAPHICAL USER INTERFACE DISPLAYING AT LEAST ONE ATTRIBUTE AND THE VALUE ASSIGNED TO AT LEAST ONE ATTRIBUTE 1608

COMPUTER-READABLE STORAGE MEDIUM 1702

COMPUTER EXECUTABLE INSTRUCTIONS 1704

AGREEMENT RENEWAL FRAMEWORK

BACKGROUND

A renewal clause in an agreement is a provision that outlines the terms and conditions for extending the contract beyond its original end date. This clause is often included in long-term contracts, such as leases, service agreements, or employment contracts, to provide the parties with the option to continue the relationship under the same terms and conditions. The renewal clause typically specifies the length of the renewal period, the process for notifying the other party of the intent to renew, and any changes to the terms of the contract that will take effect upon renewal. It is important to carefully review and understand the renewal clause, as it can have significant implications for the parties involved, including ongoing obligations and potential changes in cost. Tracking of agreements with renewal clauses may be an arduous task, especially, in cases, where multiple agreements need to be monitored. Moreover, different types of agreements (e.g., evergreen contacts, auto-renewing contracts, terminating contracts, etc.) may incorporate different types of renewal clauses that may be specific to the type of the agreement and that may, for example, trigger an automatic renewal of an agreement, even if such renewal might not be desired. This makes tracking of agreements with renewal clauses as well as the renewal clauses themselves even more difficult, if not impossible. In some existing systems, such monitoring is performed manually. In others, computing frameworks that are designed to perform monitoring consume substantial computing resources and significantly slow down network and system operations due to manual searches of agreements.

BRIEF DESCRIPTION OF THE DRAWINGS

To easily identify the discussion of any particular element or act, the most significant digit or digits in a reference number refer to the figure number in which that element is first introduced.

FIG. 14 illustrates an example method for identifying one or more renewal terms (and/or any other terms) in an agreement, according to some embodiments of the current subject matter.

FIG. 15 illustrates another example method for identifying one or more renewal terms (and/or any other terms) in an agreement, according to some embodiments of the current subject matter.

FIG. 16 illustrates yet another example method for identifying one or more renewal terms (and/or any other terms) in an agreement, according to some embodiments of the current subject matter.

DETAILED DESCRIPTION

Figure 1:
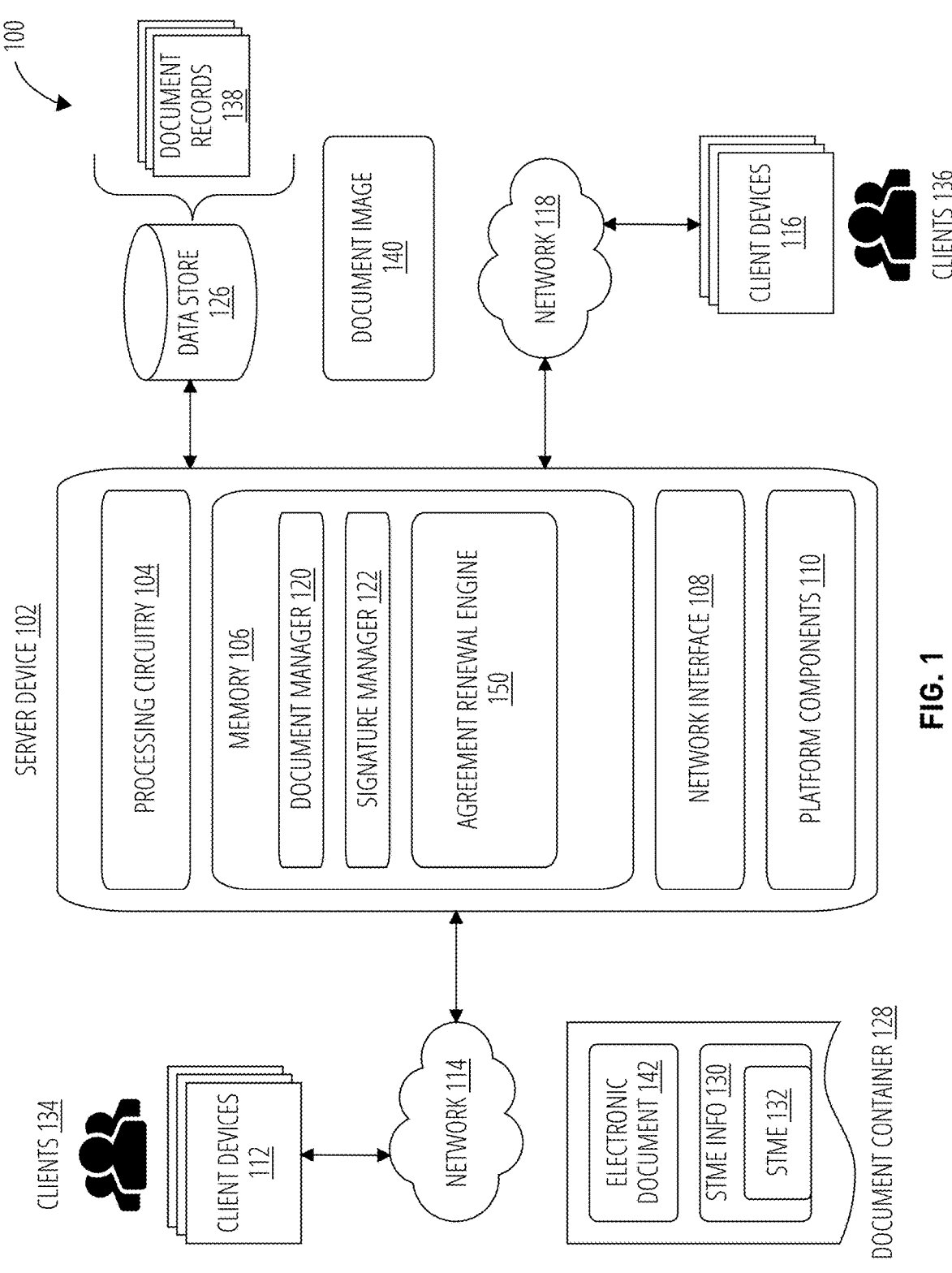
FIG. 1 illustrates a system in accordance with one embodiment.

Embodiments disclosed herein are generally directed to techniques for identification of various terms in an agreement, such as, for example, renewal terms, so that timely actions with respect to renewal of agreements may be performed, where identification of such terms are assisted through use of machine learning models and artificial intelligence architectures. In general, a document may include a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally binding agreement. Parties to an agreement can review, revise and sign the agreement from anywhere around the world on a multitude of electronic devices, such as computers, tablets and smartphones.

In some embodiments, the current subject matter relates to an agreement renewal framework that may be configured to perform identification of renewal terms in an electronic agreement document. This may be accomplished through several phases, such as, for example, generation of various portions and/or snippets from the agreement document as related to a specific subject (e.g., renewal of the agreement), where analysis of the agreement is aided by a machine learning model, e.g., a BERT model, and/or any other machine learning model. Once portions of the agreement related to the specific subject matter are identified, a query may be generated based on the specific subject, where the query may be submitted to a generative artificial intelligence (AI) model (and/or any large language model, a machine learning model, and/or any other type of model). The query may be a natural language processing query. For instance, it may state: "identify renewal terms of the agreement with ABC Company". The query along with the identified document portions and definitions of attributes (e.g., "renewal term", "renewal period", etc.) may be provided to the generative AI model for processing. The generative AI model, using query and the definitions of attributes, may analyze the document portions to identify values (e.g., time) for each of the attributes (e.g., "renewal term" has a value of "1 year", "renewal period" has a value of "15 days", etc.). The generative AI model may be trained and/or tuned using various prompts and/or datasets containing information about renewal. Once values for the attributes have been identified, the current subject matter may be configured to output the attributes and values for display on a graphical user interface of a user device. The output may be generated in the form of a table, a tabbed view, a pie chart, etc., and/or in any desired way. The output may also be searchable by specific attributes, values, etc., and/or agreements (if multiple agreement documents are processed).

In some embodiments, the current subject matter may be configured to process different types of documents, such as, for example, but not limited to legal documents (which, for example, may include different types of agreements, such as, evergreen contracts, auto-renewing contracts, terminating contracts, etc.), non-legal documents, and any combinations thereof. The document portions that may be identified may include a page in the document, a clause in the document, a paragraph in the document, a sentence in the document, a phrase in the document, a text in the document, and/or any combination thereof. The document portions include at least one of the following: a text, an audio, a video, an image, a table, and any combination thereof. As can be understood, the specific subject that may be used to identify document portions and any subsequent values is not limited to renewal of agreements. Discussion of renewals is provided herein for exemplary, illustrative purposes.

The documents that may be processed may be in any desired format, e.g., .pdf, .docx, .xls, etc. Moreover, the document may include, for instance, text, graphics, images, tables, audio, video, computing code (e.g., source code, etc.) and/or any other type of media. As part of the pre-processing, optionally, the documents, assuming it has multiple portions, pages, etc., may be split into individual portions, pages, etc., and each such portion, page, etc. may then be converted from its original format (e.g., .pdf format) to another format. Alternatively, or in addition, the document may be processed by the current subject matter system without splitting into individual portions, pages, etc. and/or conversions from one format to another. In the following description, for case of illustration only, the reference will be made to document portion(s), but as can be understood, the concepts described herein are equally applicable to entire document(s), portion(s) of document(s), page(s) in document(s), etc.

The document(s) may be provided to one or more machine learning (ML) models that may be trained to identify one or more snippets and/or portions of documents that may be related to the specific or predetermined subject. Such ML models may be trained using one or more features associated with electronic documents, portions of documents, importance factors, specific subjects (e.g., renewal, termination, etc.), etc. For example, the features may include at least one of: type(s) of electronic document(s), various content elements of electronic document(s), type(s) of task(s), position of elements in document(s), types of element(s), function(s) of element(s), and/or any other features and/or any combination thereof. The models may be trained using historical data associated with prior document analysis (e.g., determination of renewals, etc.), use of document(s), and/or any other information. Moreover, the training may involve re-training and/or refresh-training based on use of models/user feedback, etc. In some embodiments, the models may rely on labeled (e.g., labeling elements within a document as important), and/or unlabeled datasets.

The generative AI model(s) that are used to analyze the portions of document to retrieve values related to particular attributes may be part of the current subject matter system and/or be one or more third party models (e.g., ChatGPT, Bard, DALL-E, Midjourney, DeepMind, etc.). In some embodiments, the generative AI model may be provided with determined document portions of the electronic document (e.g., the agreement), the electronic document itself, definitions of the attributes (e.g., renewal terms), and/or a specific query (e.g., "find renewal terms") and may use the provided information to generate one or more responses to the specific query (e.g., as stated above, "the renewal term of this agreement is 1 year", etc.). For example, the generative AI model may be provided with the sales agreement, one or more selected portions of the agreement related to renewal, and may be asked to determine renewal values for each of the renewal attributes (e.g., "agreement term", "renewal term", "renewal period", etc.). Optionally, in some embodiments, the generative AI model may be configured to generate one or more summar(ies), guidance(s), instruction(s) and/or directive(s) based on analysis of this information. In some embodiments, summar(ies), guidance(s), instruction(s) and/or directive(s) may be limited to the specific query and/or document. The renewal terms and/or any summar(ies), guidance(s), instruction(s) and/or directive(s), which may be user-friendly, may be generated in any desired format and/or form. The renewal terms and/or summar(ies), guidance(s), instruction(s) and/or directive(s) may also include explanations of query/document/portions of the document and outline what other information/documents/actions may be needed.

In some embodiments, the current subject matter may be configured to receive feedback from at least one user computing device. The feedback may be provided to the determined renewal terms, identified document portions, definitions of attributes, specific subject, etc. Once feedback is received, the current subject matter may be configured to update identified portions of the document, renewal terms, attribute definitions, etc. Moreover, the feedback may be used to train, retrain, refresh train, etc. one or more machine learning (ML) models and/or generative AI models that may be used for the purposes of identifying document portions, determining renewal terms, etc. As can be understood, the feedback may be used to perform any desired action and/or any combination of actions.

In some embodiments, the user may provide feedback (e.g., "thumbs up", "thumbs down", vote, written feedback, etc.). The feedback may be used to adjust and/or finetune, for example, how documents/portions are identified, how renewal values are selected, etc. For example, too many thumbs down on a particular renewal value may mean that the renewal value was identified incorrectly, and its identification may need be updated.

The current subject matter may have one or more of the following technical benefits. In particular, the current subject matter may be configured to more accurately and efficiently identify specific values of terms in the electronic documents, e.g., renewal terms of an agreement. This streamlines computing operations associated with analysis of documents and subsequent actions that may need to be undertaken. Further, the current subject matter significantly reduces occurrence of errors in identifying terms of agreements (e.g., incorrectly identifying renewal terms may lead to loss of legal rights, profits, etc.) Additionally, review, search, etc. of data in agreement documents may be expedited. Moreover, the current subject matter may be configured to efficiently and effectively identify and perform tracking of agreement terms in different types of legal agreements (e.g., evergreen contracts, auto-renewing contracts, terminating contracts, and/or any other type of contracts). Conventional systems are unable to account for the different types of agreements and the specific aspects (e.g., different renewal terms) that they may entail, thus, resulting in unwanted renewals, lapsed legal rights, lost profits, and/or other problems.

The present disclosure will now be described with reference to the attached drawing FIGURES, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application, or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by Docu-Sign®, Inc., located in San Francisco, California ("Docu-Sign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMP, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for electronic document(s) and/or collections of electronic documents (which may also be referred to as "transaction documents", "transaction packages", "document packages" or "packages") and/or information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organizations to amass a significant number of electronic documents, including both signed electronic documents and unsigned electronic documents. As such, the system 100 may need to manage a large collection of electronic documents for different entities, a task that is sometimes referred to as contract lifecycle management (CLM).

As shown in FIG. 1, the system 100 may include a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 18:
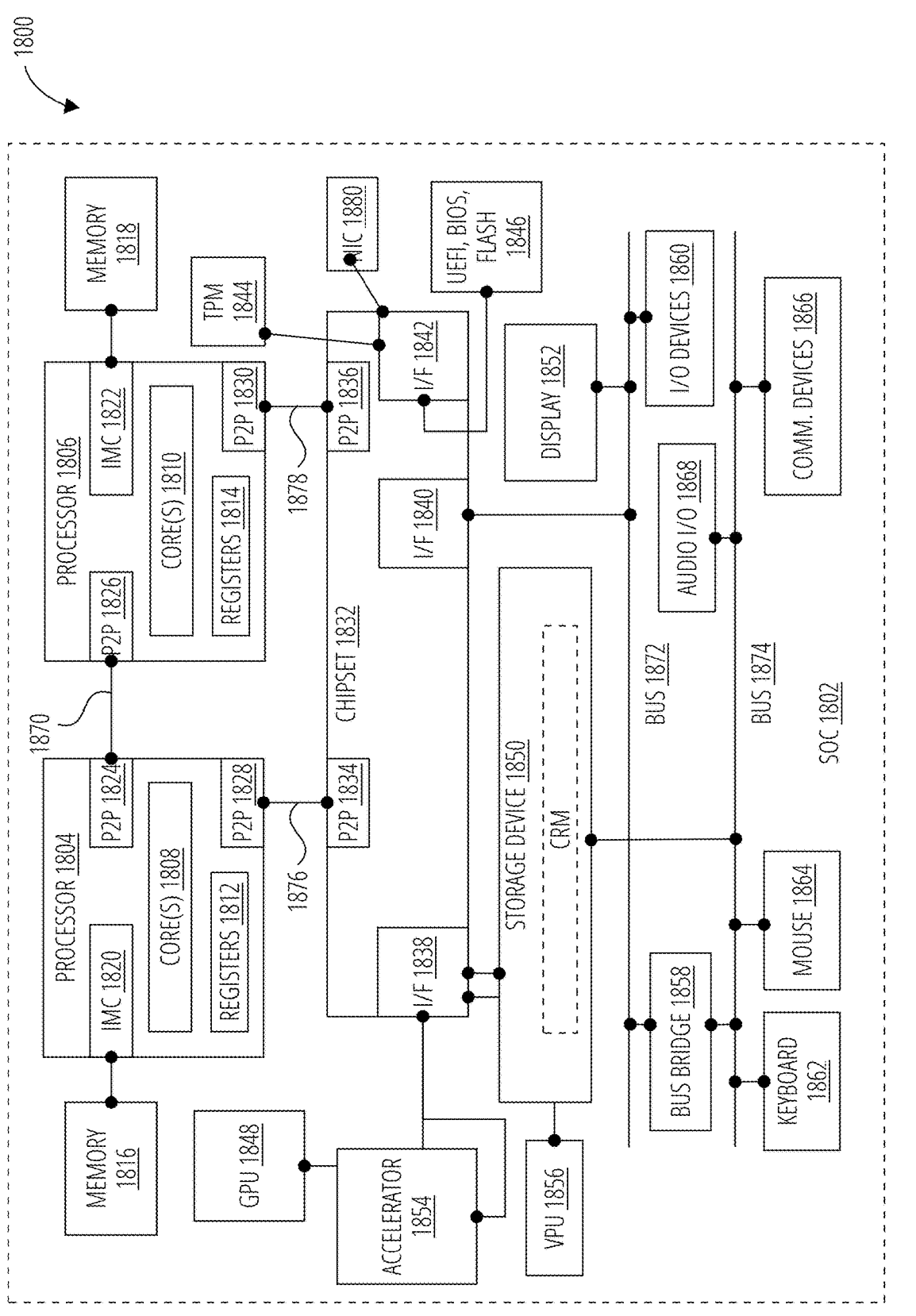
FIG. 18 illustrates a computing architecture in accordance with one embodiment.

In various embodiments, the server device 102 may include various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 1800 as depicted in FIG. 18.

Figure 19:
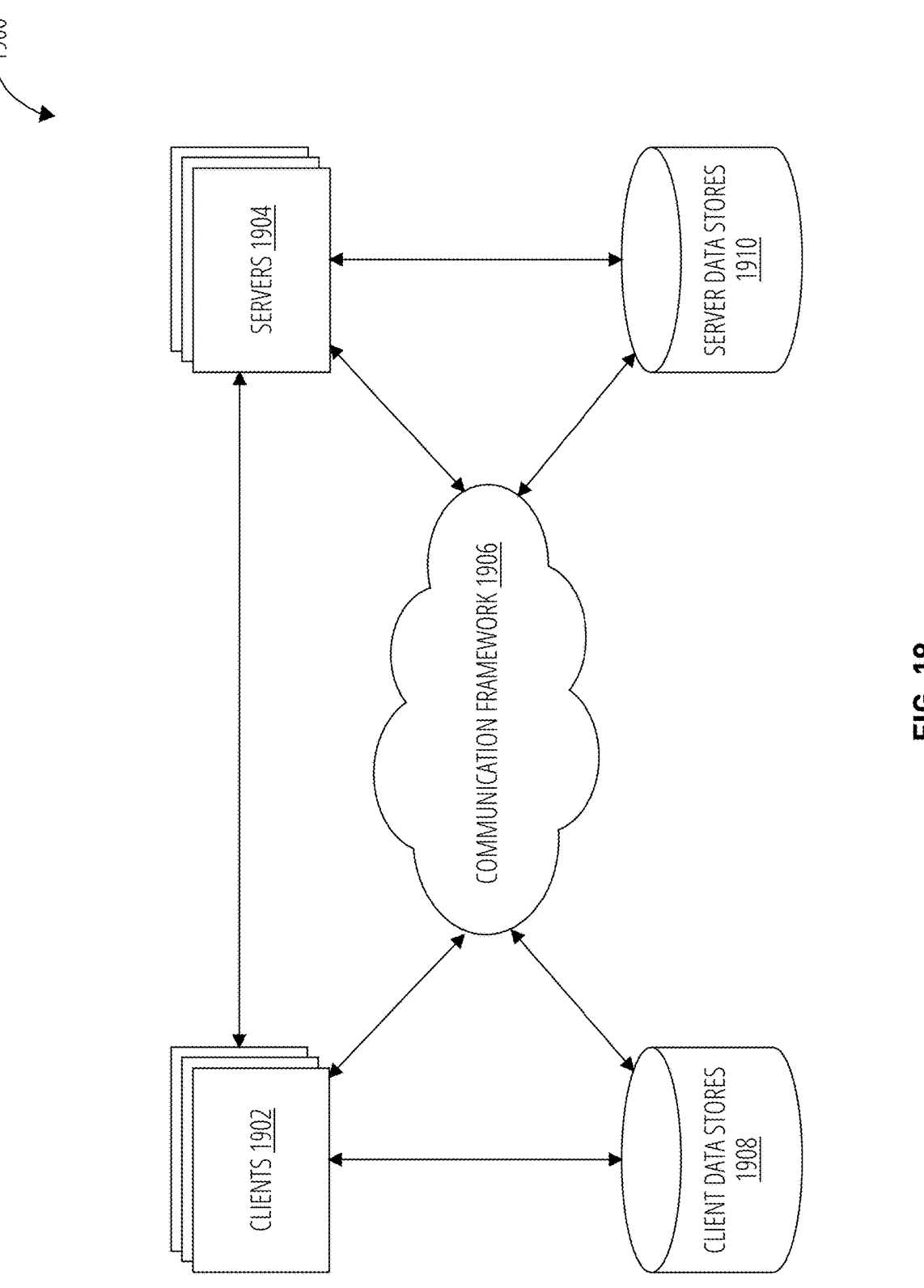
FIG. 19 illustrates a communications architecture in accordance with one embodiment.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 1900 as depicted in FIG. 19.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may include a document manager 120, a signature manager 122, and an agreement renewal engine 150, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more workflows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may include one or more STME 132, which are graphical user interface (GUI) elements superimposed on the electronic document 142. The GUI elements may include textual elements, visual elements, auditory elements, tactile elements, and so forth. In some embodiments, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools applications, and workflows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes an electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140 and send the signed document image 140 to the server device 102 for verification, recordation, and storage.

Figure 6:
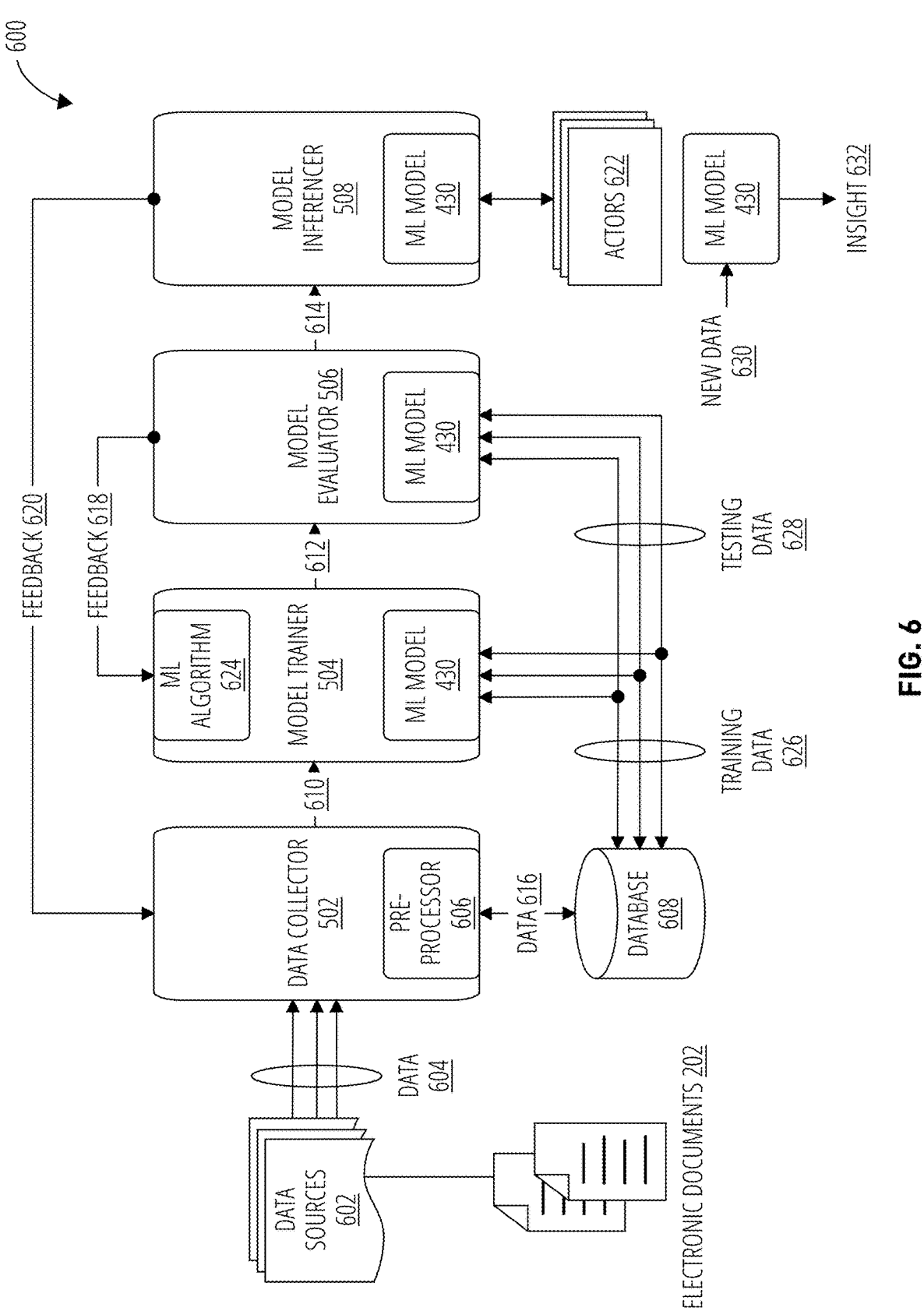
FIG. 6 illustrates an artificial intelligence architecture that may be used by the training device to generate the ML model (e.g., as shown in FIG. 2) for deployment by the inferencing device.

The engine 150 may implement and/or manage various artificial intelligence (AI) and machine learning (ML) agents to assist in various operational tasks for the EDMP of the system 100. The AI/ML agents and their operation associated with the agreement renewal engine 150, and associated software elements, are described in more detail with reference to an artificial intelligence architecture 600 as depicted in FIG. 6. The engine 150, and associated hardware elements, are described in more detail with reference to a computing architecture 1800 as depicted in FIG. 18.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

Figure 8:
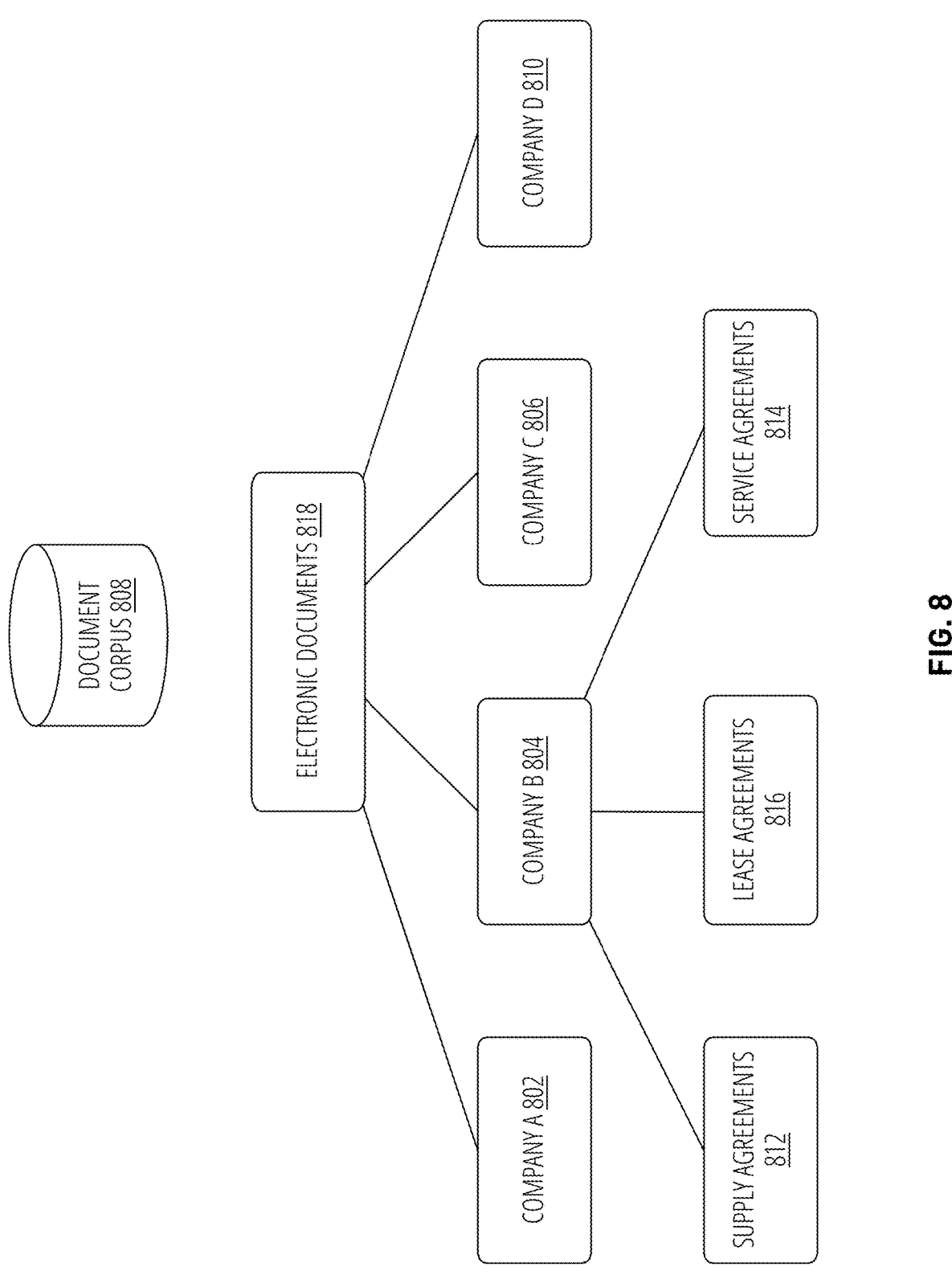
FIG. 8 illustrates a document corpus in accordance with one embodiment.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the electronic documents 818, as shown in FIG. 8, with tools, applications, and workflows developed by DocuSign. For example, the electronic documents 818 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device

116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more workflows developed by Adobe Systems Incorporated. The STME 132 input may be received from and generated by workflows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally, or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally written document, a modification of a previous electronic document, or from a document template with predefined information content. Once prepared, the signature manager 122 may implement electronic signature (c-sign) tools, features, processes and workflows provided by the signature manager 122 of the server device 102 to facilitate electronic signing of the electronic document 142.

In addition, as discussed above, the system 100 may include an agreement renewal engine 150. The agreement renewal engine 150 may implement a set of tools and/or algorithms to process documents for the purposes of identifying certain terms (e.g., renewal terms) in an electronic agreement document. The engine 150 may be configured to process different types of agreements, such as, for example, evergreen contracts (e.g., contacts that renew automatically unless specifically cancelled by the parties (typically used in employee stock plans, rental leases, insurance policies, revolving loans, etc.)), auto-renewing contracts, terminating contracts, and/or any other types of contracts, and may provide a framework for tracking and determination of whether or not a particular agreement, which may or may not be based on the type of the agreement, should be renewed. The agreement renewal engine 150 may be configured to receive and/or retrieve one or more electronic documents, such as, for example, an agreement, and extract, using a machine learning (ML) model, one or more portions from the document. Each portion may be associated with a predetermined subject (e.g., renewal of an agreement, termination of an agreement, etc.). The ML model may be any desired machine learning model, such as, for example, a BERT model and/or any other type of model. For example, a portion may be a termination clause in an agreement (e.g., a master services agreement, etc.) stating "the term of this agreement is 1 year from the date of signing, unless renewed", or a renewal clause stating "this agreement may be renewed for another term of 1 year upon written agreement by the parties", or a renewal clause specifying a renewal period, which may state "this agreement shall be renewed within 15 days from the date of termination", and/or any other clause.

Once portions of the document are identified, the agreement renewal engine 150 may be configured to generate a query that may seek to retrieve certain values for one or more attributes from the document portions. Each attribute may be specifically defined and may be associated with the specific subject. The query may be a natural language processing query and/or any other type of query. For instance, the query may state: "Find renewal terms of agreement with ABC Company". The engine 150 may provide the generated query, the definitions of attributes and the identified portions of the document to another machine learning model, a generative AI model, and/or any other model. The model may be trained using prompts, historical dataset (e.g., historical dataset related to renewals, etc.). Subsequent to its analysis, the model may output values correlating them to attributes based on the provided definitions of attributes.

For example, the attributes can include a "renewal term" of the agreement, a "renewal notice period" of the agreement, a "term" of the agreement, etc. The values that may be assigned to attributes may include time, e.g., the "renewal term" attribute may be assigned a value of "1 year", the "renewal notice period" attribute may be assigned a value of "15 days", etc. Once the values are ascertained, the agreement renewal engine 150 may be configured to generate a graphical user interface that may display the attribute(s) and value(s) assigned to the respective attribute(s).

Figure 2:
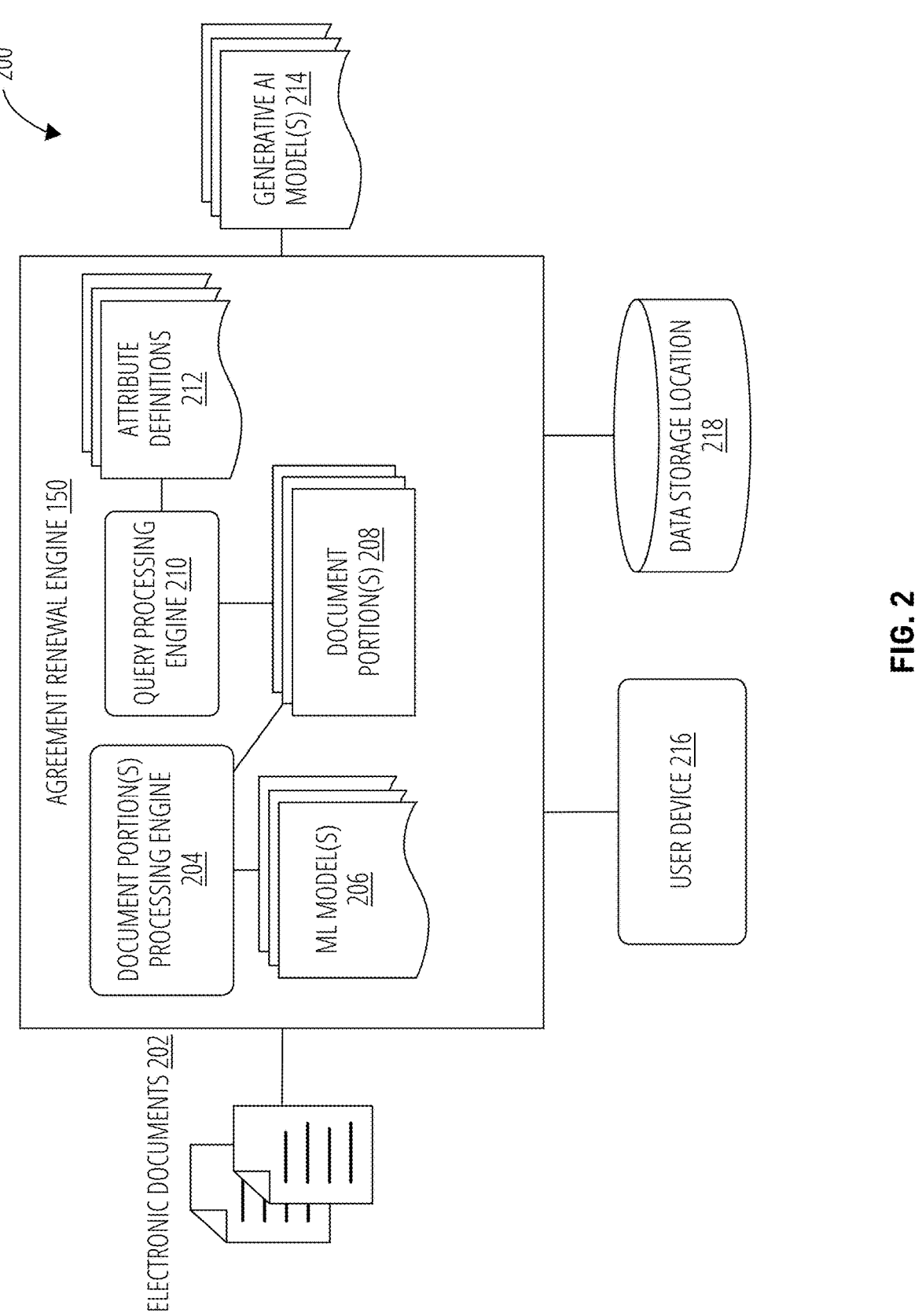
FIG. 2 illustrates an example system showing operation of the agreement renewal engine, according to some embodiments of the current subject matter.

FIG. 2 illustrates an example system 200 showing operation of the agreement renewal engine 150, according to some embodiments of the current subject matter. The agreement renewal engine 150 may include a document portion(s) processing engine 204, a query processing engine 210, along with various attribute definitions 212. The agreement renewal engine 150 may also be communicatively coupled to one or more user devices 216. The engine 150 may also implement one or more machine learning (ML) models 206. In some embodiments, one or more electronic documents and/or portions of documents 202 (hereinafter, electronic documents 202) may be received, retrieved, queried and/or processed by the engine 150 for analysis by a generative AI model(s) 214 in connection the determining values for one or more attributes defined by the attribute definitions 212.

One or more components of the system 200 shown in FIG. 2 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 200 may include any combination of hardware and/or software. In some embodiments, one or more components of the system may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example embodiments, one or more components of the system may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with interface and/or document certification processes disclosed herein.

In some embodiments, one or more components of the system 200 may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 200 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the interface and/or document certification functions described herein. One or more components of the system may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some example embodiments, one or more components of the system 200 may execute one or more applications, such as software applications, that enable, for example, network communications with one or more components of system and transmit and/or receive data.

One or more components of the system 200 may include and/or be in communication with one or more servers via one or more networks and may operate as a respective front-end to back-end pair with one or more servers. One or more components of the system may transmit, for example from a mobile device application (e.g., executing on one or more user devices, components, etc.), one or more requests to one or more servers. The requests may be associated with retrieving data from servers (e.g., retrieving one or more electronic documents from one or more document storage sources that may store electronic documents 202). The servers may receive the requests from the components of the system. Based on the requests, servers may be configured to retrieve the requested data from one or more storage locations. Based on receipt of the requested data from the databases, the servers may be configured to transmit the received data to one or more components of the system, where the received data may be responsive to one or more requests.

The system 200 may include one or more networks, such as, for example, networks that may be communicatively coupling the engine 150, the document storage source (e.g., storing electronic documents 202), and/or any other computing components. In some embodiments, networks may be one or more of a wireless network, a wired network or any combination of wireless network and wired network and may be configured to connect the components of the system and/or the components of the system to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 200 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system.

Further, one or more components of the system 200 may be configured to execute one or more actions using one or more containers. In some embodiments, each action may be executed using its own container. A container may refer to a standard unit of software that may be configured to include the code that may be needed to execute the action along with all its dependencies. This may allow execution of actions to run quickly and reliably.

For illustrative purposes only, the following description is presented in connection with identification of renewal terms, obligations, etc., which may be contained in various agreements. In some example, non-limiting embodiments, the current subject matter may be configured to execute one or more of its processes based on a determination of a type of electronic document (e.g., an agreement of a particular type (e.g., evergreen contract, auto-renewing contract, terminating contract, etc.). Alternatively, or in addition, the current subject matter may be configured to perform its processes regardless of the type of the document. As can be understood, the current subject matter is applicable to analysis of any type of electronic documents in connection with identification of any data, information, values, etc. that may be related to a specific subject. In that regard, in some example, non-limiting embodiments, the electronic documents 202 that may be processed by the system 200 for the purposes of determining renewal terms of agreements. The documents 202 may be stored in various data storages (e.g., data storage location 218) that may be configured to be one or more private databases, access to which might not be publicly available (e.g., internal company databases, specific user access databases, etc.). The electronic documents 202 stored in these databases may be organized in a predetermined fashion, which may allow case of access to the electronic documents and/or any portions thereof. For example, electronic documents 202 stored in these databases may be labeled, searchable, and/or otherwise, easily identifiable. The documents may be stored in a particular electronic format (e.g., PDF, .docx, etc.). The electronic documents 202 may be structured and/or unstructured.

Other data storage sources may be configured to be public non-government databases, government databases (e.g., SEC-EDGAR, etc.), etc. and may store various electronic documents, such as, for example, legal documents (e.g., commercial contracts, lease agreements, public disclosures (e.g., 10k statements, 5k statements, quarterly reports, etc.)), non-legal documents (e.g., articles, books, etc.). The electronic documents 202 stored in these databases may be identified using various identifiers, which may allow location of these documents in the databases, however, contents of electronic documents stored therein might not be parsed and/or specifically identified. For example, a review of the entire electronic document (e.g., 10k statement of a company stored in SEC-EDGAR database) may need to be performed to identify a particular section (e.g., a section related to compensation of executives for the company).

In operation, one or more electronic documents 202 may be supplied to the agreement renewal engine 150. As stated above, the documents may be any type of documents, such as, for example, agreements, applications, websites, video files, audio files, text files, images, graphics, tables, spreadsheets, computer programs, etc. The documents may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document); one document may be linked to another document, etc.

In some embodiments, electronic documents 202 may include one or more portions. Examples of such portions may include pages, headings, sub-headings, sections, paragraphs, sentences, tables, images, parties, conditions, terms, specific descriptions, and/or any other type of portions. One or more portions may also be associated and/or assigned one or more functions (e.g., a document title, a text heading, a text paragraph, etc.). The documents 202 may be structured in a particular way (e.g., an application for an automobile insurance that may include sections seeking various information from applicants; a lease agreement that may include a section identifying parties, a section identifying leased premises, a section describing rent being paid, etc.). The document 202 may also be unstructured.

Upon receiving electronic documents 202, the agreement renewal engine 150 may be configured to perform some initial processing of the documents, e.g., execute optical character recognition, determine any metadata associated with the document, and/or execute any other functions. Optionally, the engine 150 may be configured to determine a type of the electronic document(s) for the purposes of performing further processing, such as, for example, identification, tracking, etc. of renewal terms. The agreement renewal engine 150 may be configured process the received document(s) 202 using one or more ML model(s) 206. As a result of this processing, one or more document portion(s) 208 may be generated. The document portion(s) 208 may be from the same document, e.g., portions of the same agreement that may relate to term, renewal, etc. Alternatively, or in addition, the document portion(s) 208 may be from different documents 202.

The document portion(s) processing engine 204 may be configured to select a predetermined machine learning (ML) model from one or more ML model(s) 206. The models may be selected based on a specific task that may be received. For example, a task relating to analysis of agreement(s) for renewal terms may cause the document portion(s) processing engine 204 to identify and select a model 206 that may be trained to identify portions of the electronic document related to term, renewal, etc. The models 206 may be trained using labeled, partially labeled, and/or unlabeled data, and/ or any other type of data. Moreover, the models 206 may be re-trained, refresh-trained, etc. based on user feedback that may be received from user device 216 in response to output provided to the user device 216.

Figure 11:
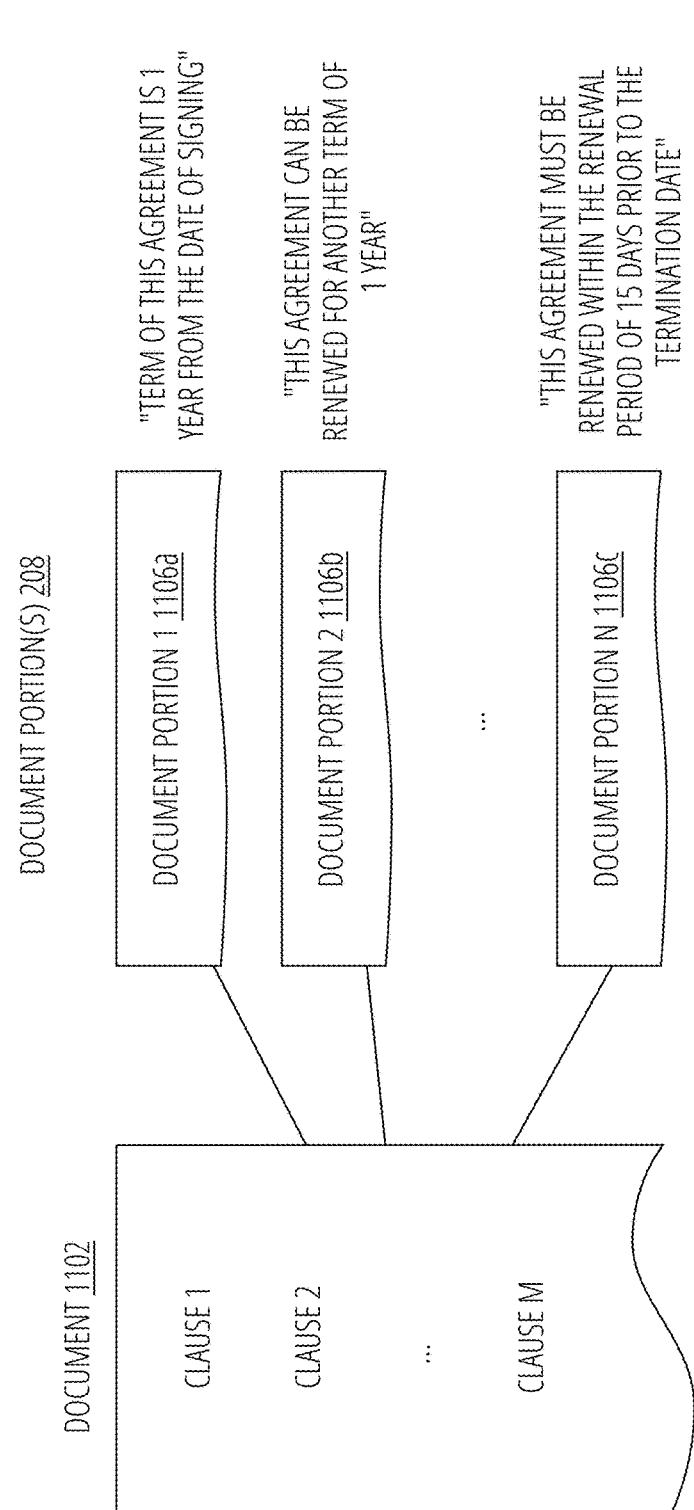
FIG. 11 illustrates further details of operation of the document portion(s) processing engine, according to some embodiments of the current subject matter.

The document portion(s) processing engine 204 may then apply the identified ML model(s) 206 to the electronic document, e.g., agreement. Application of the identified ML model(s) 206 may result in generation of one or more document portion(s) 208 of the electronic document (such as, for example, portions 1106a, 1106b, 1106c, as shown in FIG. 11). In some example embodiments, the document portion(s) 208 may be identified using semantic search, keyword search, and/or using any other way. Identification of portions within the document may be based on the specific or predetermined subject, e.g., renewal, term, etc. The specific or predetermined subject may be defined based on a type of the electronic document (e.g., a sales contract, a lease agreement, an application for employment, a computer program, etc.), a location of portions, clauses, paragraphs, etc. in the electronic document (e.g., first page, last page, etc.), a type of each portion, clause, paragraph, etc. (e.g., a table, an image file, a text, etc.) in the electronic document, one or more functions of each portion, clause, paragraph, etc. (e.g., a header, a section header, a subheading, etc.) in the electronic document, etc. As can be understood, any other factors may be used by the document portion(s) processing engine 204 to generate document portion(s) 208 of the electronic document.

Once the document portion(s) 208 are identified, they may be provided to the query processing engine 210. The query processing engine 210 may be configured to generate a query to the generative AI model(s) 214. The query may include one or more document portion(s) 208 as well one or more attribute definitions 212. The query may be a natural language processing query, and may state, for example, "identify renewal terms of the agreement with ABC Company". The document portion(s) 208 that may be provided to the generative AI model(s) 214 may include texts of a termination clause in the agreement, a renewal clause in the agreement, and/or any other relevant clauses that refer to term, termination, renewal, etc. The attribute definitions 212 may include an identification of attributes and their respective explanations or definitions. For example, "renewal term" attribute may be defined as "a time period for which this agreement is renewed", "renewal period" attribute may be defined as "time within which to renew the agreement", etc.

In some embodiments, the query processing engine 210 may use generative AI model(s) 214 to determine whether any of the document portion(s) 208 include values that may be matching one or more attributes provided in the attribute definitions 212, and if so, extract such values so that they can be assigned to specific attributes. For example, the engine 210 may determine, using the generative AI model(s) 214, that a portion 208 (e.g., renewal clause of a sales agreement) includes a renewal term of 1 year. In some example, non-limiting embodiments, the engine 210 may use natural language processing and/or any other object recognition processes to determine whether certain values are present in the document portion(s) 208 that match attributes contained in the attribute definitions 212. For instance, the engine 210 may search the document portion(s) 208 to determine presence of specific terms, words, phrases, sentences, paragraphs, etc., which may be identified as one or more attributes defined by attribute definitions 212.

The generative AI model(s) 214 may be trained using datasets that may include labeled objects (e.g., labeled clauses, sentences, paragraphs, etc. related to termination) that the query processing engine 210, using generative AI model(s) 214, may be expected to determine and extract. The data in the training datasets may include any data that has been previously identified, e.g., as renewal attributes and values, etc. The data in the training datasets may also include data resulted from executions of processes by the agreement renewal engine 150, where the data may be appropriately anonymized, if necessary. The ML model(s) 206 and/or generative AI model(s) 214 may be part of the engine 150 and/or be one or more third party models, including, but not limited to, any artificial intelligence generative models, e.g., ChatGPT, Bard, DALL-E, Midjourney, DeepMind, etc., and may be accessed by the query processing engine 210.

Figure 12:
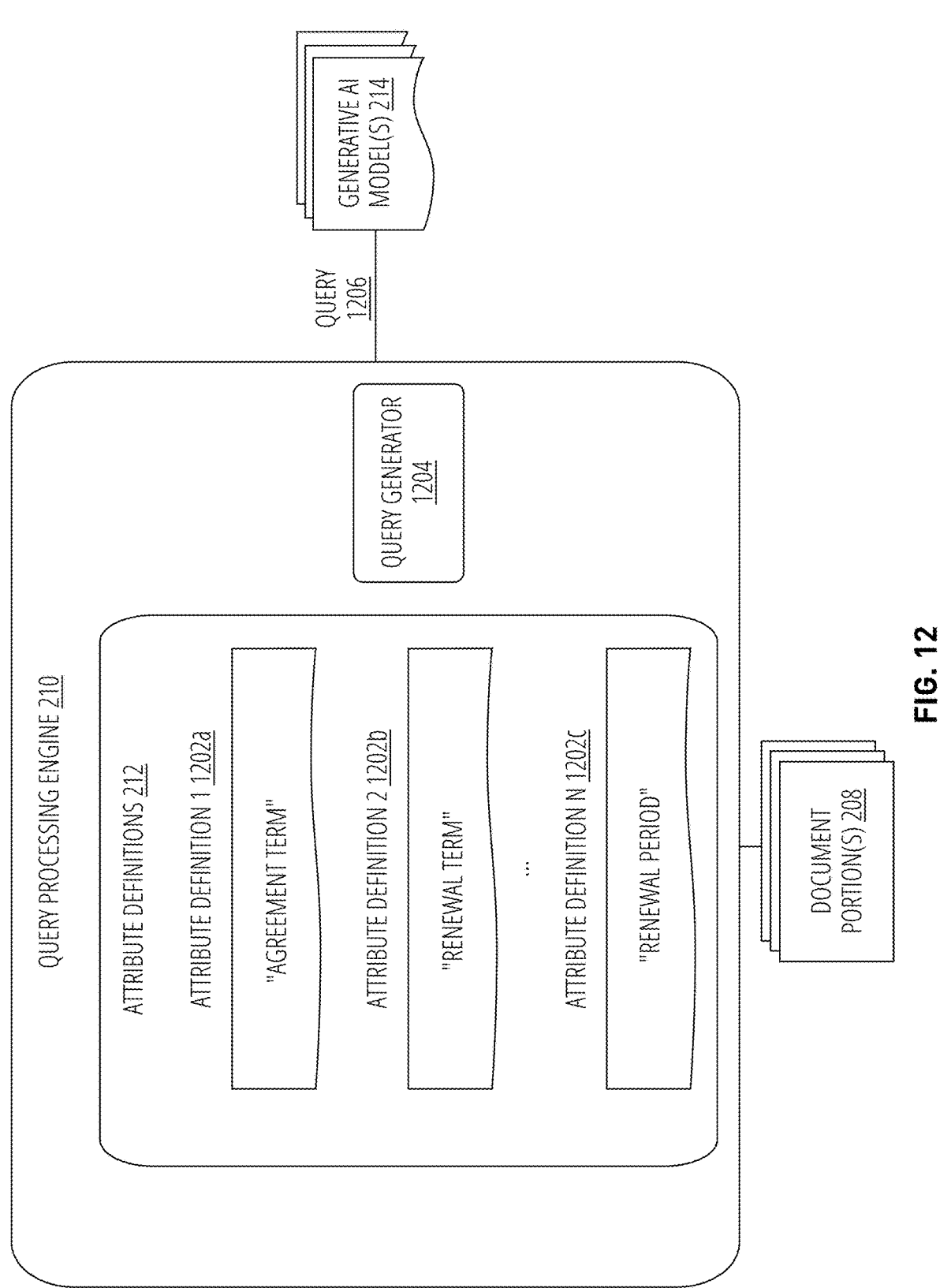
FIG. 12 illustrates an example operation of the query processing engine, according to some embodiments of the current subject matter.

Once the generative AI model(s) 214 generated a response to the query (e.g., query 1206 as shown in FIG. 12), it may send the response to the agreement renewal engine 150, and in particular, to its query processing engine 210. The query processing engine 210 may assemble the information that may include the response from the generative AI model(s) 214 (e.g., values assigned to attributes) and provide it as output for presentation on a graphical user interface of the user device 216. The output may be presented in any desired form (e.g., as a text file, as an audio file, as an image, as a graphic, as a video file, etc.).

The user may also use the user device 216 to provide feedback to the agreement renewal engine 150. The feedback may also be in response to identified document portion(s) 208, one or more attribute definitions 212, one or more values assigned to attributes, one or more queries to generative AI model(s) 214, etc. The feedback may be any type of feedback, such as, for example, a yes/no vote (e.g., thumbs up, thumbs down, etc.) that may indicative of the user's acceptance of and/or satisfaction with identified document portion(s) 208, one or more attribute definitions 212, one or more values assigned to attributes, one or more queries to generative AI model(s) 214, etc. The feedback may be textual feedback that may include specific comments that may be written and sent to the agreement renewal engine 150 by the user using the user device 216. As can be understood, any other type of feedback may be provided.

The agreement renewal engine 150 may receive the user's feedback (whether positive or negative or neutral) and use it for various purposes. For example, the agreement renewal engine 150 may update the identified document portion(s) 208, one or more attribute definitions 212, one or more values assigned to attributes, one or more queries to generative AI model(s) 214, etc. The agreement renewal engine 150 may also identify ML model(s) 206 and/or generative AI model(s) 214 for the purposes of identified document portion(s) 208, one or more attribute definitions 212, one or more values assigned to attributes, one or more queries to generative AI model(s) 214, etc., updating existing ML model(s) 206 and/or generative AI model(s) 214, etc. Further, the agreement renewal engine 150 may use the user's feedback to update the ML model(s) 206 and/or generative AI model(s) 214 that are used for any of the above purposes. Alternatively, or in addition, the agreement renewal engine 150 may generate one or more updated identified document portion(s) 208, one or more attribute definitions 212, one or more values assigned to attributes, one or more queries to generative AI model(s) 214, etc. As can be understood, any other actions may be performed by the agreement renewal engine 150 based on the user feedback. For example, the agreement renewal engine 150 may train, re-train, refresh-train and/or create new ML model(s) 206 and/or generative AI model(s) 214. Feedback may be used to update any of the above operations and/or how any of them are performed. This process may continue until the user has no further feedback.

In some embodiments, the identified document portion(s) 208, one or more attribute definitions 212, one or more values assigned to attributes, one or more queries to generative AI model(s) 214, etc. may be stored in the data storage location 218. For example, a data storage object may be generated that may include the received document 202, identified document portion(s) 208, one or more attribute definitions 212, one or more values assigned to attributes, one or more queries to generative AI model(s) 214, etc. The data storage object stored in the data storage location 218 may include any relevant metadata associated with one or more of the above (e.g., original document 202, document portions, etc.). The data storage object may then, for example, be retrieved for training of one or more ML model(s) 206 and/or generative AI model(s) 214 as well as for any other purposes.

Figure 3:
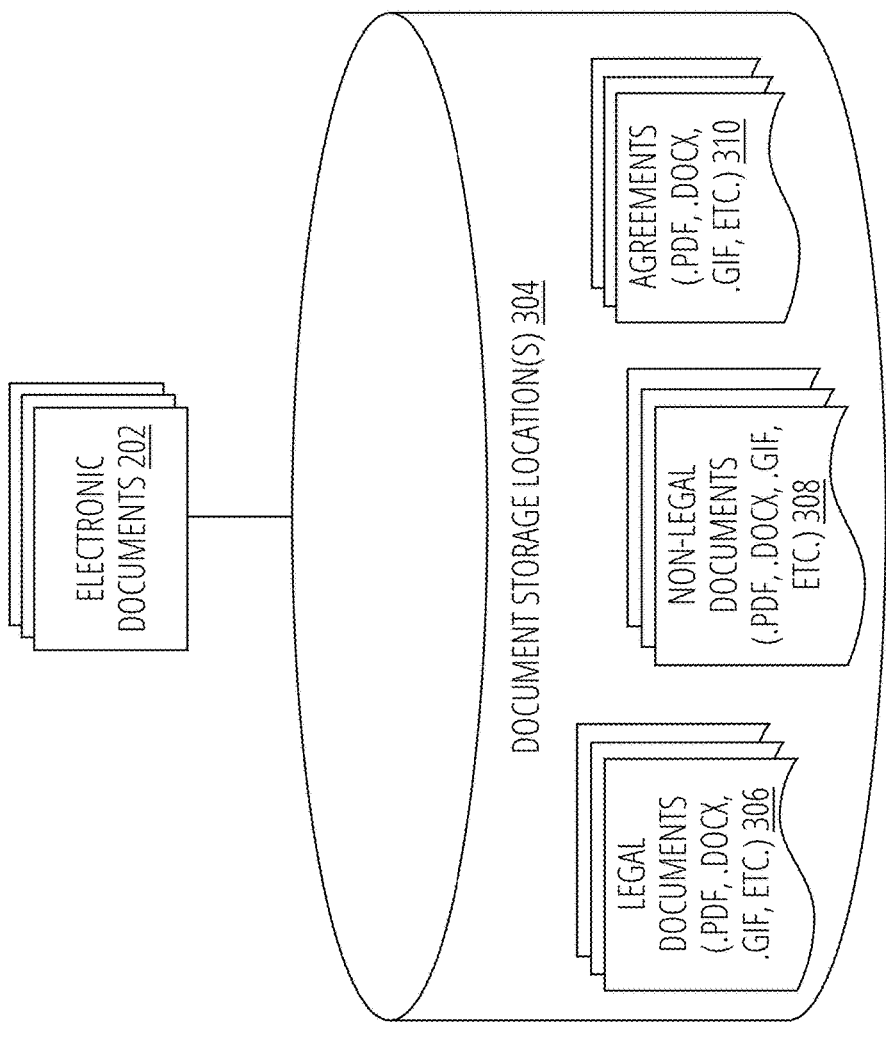
FIG. 3 illustrates an example of document storage location(s) that may be used as a source for the electronic documents, according to some embodiments of the current subject matter.

FIG. 3 illustrates an example of document storage location(s) 304 that may be used as a source for the electronic documents 202, according to some embodiments of the current subject matter. The document storage location(s) 304 may be a single database, repository, etc. and/or multiple databases, repositories, etc. The document storage location(s) 304 may be configured to store any type of documents, data, information, files, etc.

The documents may be any type of documents, such as, for example, agreements, applications, websites, video files, audio files, text files, images, graphics, tables, spreadsheets, computer programs, etc. For example, as shown in FIG. 3, the document storage location(s) 304 may store one or more legal documents 306, non-legal documents 308, and/or agreements 310. Any of the documents 306, 308, and/or 310 may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document); one document may be linked to another document, etc. As such, the document storage location(s) 304 may be a unified data storage location that may store any type, any size, any format, etc. documents, data, information, etc.

In some embodiments, the documents stored in the document storage location(s) 304 may be structured, unstructured, and/or semi-structured. Moreover, the documents may be labeled and/or unlabeled. For example, one or more documents stored in the document storage location(s) 304 may have been processed by one or more ML model(s) 206 and/or generative AI model(s) 214 for the purposes of identifying document portion(s) 208, one or more attribute definitions 212, assignment of one or more values to attributes, generation of one or more queries to generative AI model(s) 214, etc., and/or perform any other operations.

The documents stored in document storage location(s) 304 may be queried, searched, and/or retrieved by and/or provided to the agreement renewal engine 150 as electronic documents 202. For example, the agreement renewal engine 150 may retrieve all or particular sales agreements from the document storage location(s) 304 for the purposes of identifying document portion(s) 208, one or more attribute definitions 212, assignment of one or more values to attributes, generation of one or more queries to generative AI model(s) 214, etc., and/or perform any other operations.

Figure 4:
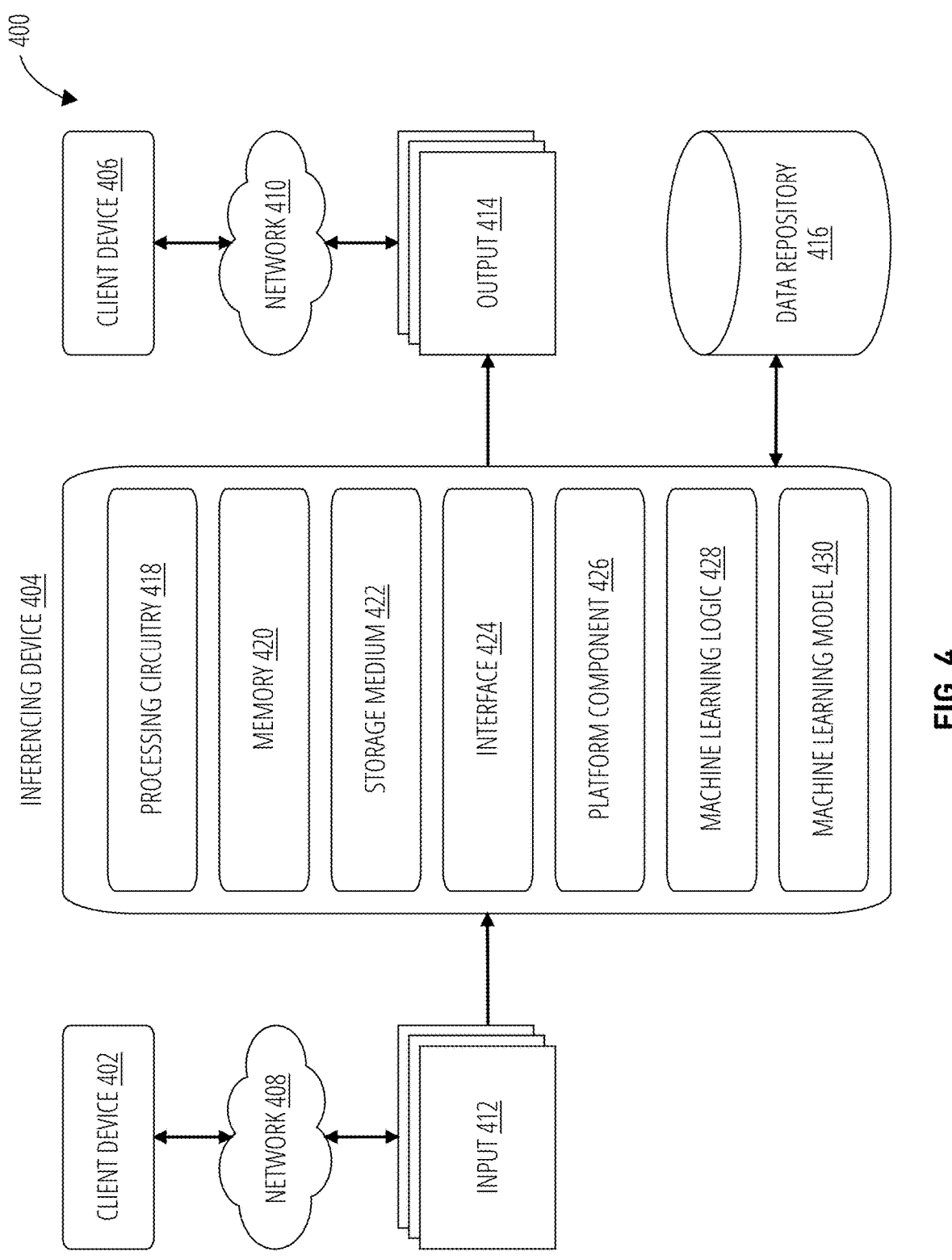
FIG. 4 illustrates an example of an AI/ML system that may be used for generating one or more transaction packages and/or guiding the user through one or more tasks, documents, etc., according to some embodiments of the current subject matter.

FIG. 4 illustrates an example of an AI/ML system 400 that may be used for generating one or more portions of an electronic document 202 based on a structure of the document, etc., according to some embodiments of the current subject matter. The system 400 may include a set of M devices, where M is any positive integer. As shown in FIG. 4, the system 400 may include three devices (M=3), such as a client device 402, an inferencing device 404, and a client device 406. The inferencing device 404 may communicate information with the client device 402 and the client device 406 over a network 408 and a network 410, respectively. The information may include input 412 from the client device 402 and output 414 to the client device 406, or vice-versa. In some embodiments, the input 412 and the output 414 may be communicated between the same client device 402 or client device 406. In another alternative, the input 412 and the output 414 may be stored in a data repository 416. Alternatively, or in addition, the input 412 and the output 414 are communicated via a platform component 426 of the inferencing device 404, such as an input/output (I/O) device (e.g., a touchscreen, a microphone, a speaker, etc.).

As shown in FIG. 4, the inferencing device 404 may include a processing circuitry 418, a memory 420, a storage medium 422, an interface 424, a platform component 426, ML logic 428, and an ML model 430. In some embodiments, the inferencing device 404 may include other components and/or devices as well. Examples for software elements and hardware elements of the inferencing device 404 are described in more detail with reference to a computing architecture 1800 as depicted in FIG. 18. Embodiments are not limited to these examples.

The inferencing device 404 may generally be arranged to receive an input 412, process the input 412 via one or more AI/ML techniques, and send an output 414. The inferencing device 404 may receive the input 412 from the client device 402 via the network 408, the client device 406 via the network 410, the platform component 426 (e.g., a touch-screen as a text command or microphone as a voice command), the memory 420, the storage medium 422 or the data repository 416. The inferencing device 404 may send the output 414 to the client device 402 via the network 408, the client device 406 via the network 410, the platform component 426 (e.g., a touchscreen to present text, graphic or video information or speaker to reproduce audio information), the memory 420, the storage medium 422 or the data repository 416. Examples for the software elements and hardware elements of the network 408 and the network 410 are described in more detail with reference to a communications architecture 1900 as depicted in FIG. 19. Embodiments are not limited to these examples.

The inferencing device 404 may include ML logic 428 and an ML model 430 to implement various AI/ML techniques for various AI/ML tasks. The ML logic 428 may receive the input 412 and process the input 412 using the ML model 430. The ML model 430 may perform inferencing operations to generate an inference for a specific task from the input 412. In some embodiments, the inference is part of the output 414. The output 414 may be used by the client device 402, the inferencing device 404, or the client device 406 to perform subsequent actions in response to the output 414.

In some embodiments, the ML model 430 may be a trained ML model 430 using a set of training operations. An example of training operations to train the ML model 430 is described with reference to FIG. 5.

Figure 5:
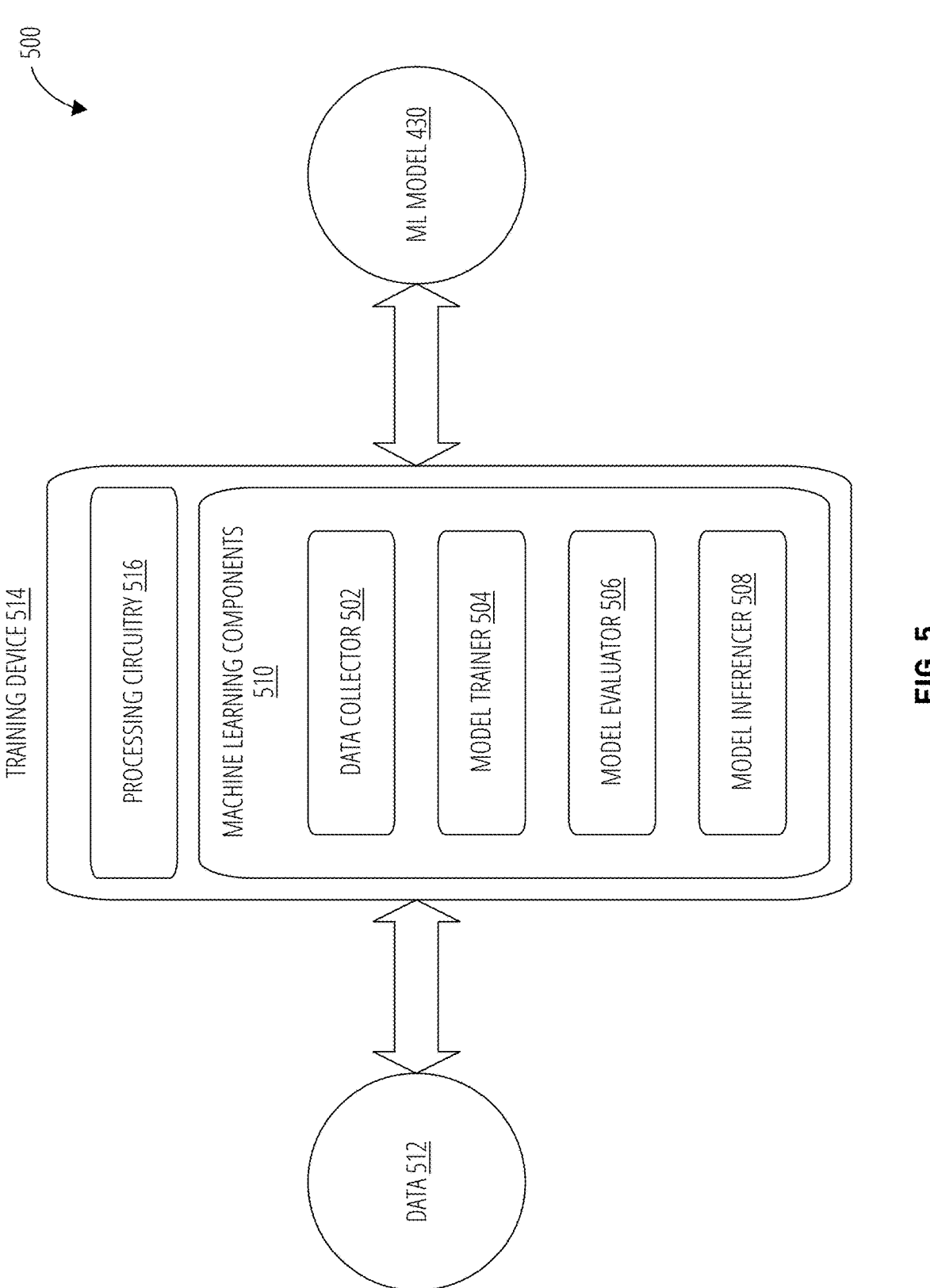
FIG. 5 illustrates an example apparatus that may include a training device suitable to generate a trained ML model for the inferencing device of the system shown in FIG. 4.

FIG. 5 illustrates an example apparatus 500 that may include a training device 514 suitable to generate a trained ML model 430 for the inferencing device 404 of the system 400. As shown in FIG. 5, the training device 514 may include a processing circuitry 516 and a set of ML components 510 to support various AI/ML techniques, such as a data collector 502, a model trainer 504, a model evaluator 506 and a model inferencer 508.

In general, the data collector 502 may collect data 512 from one or more data sources to use as training data for the ML model 430. The data collector 502 may collect different types of data 512, such as, text information, audio information, image information, video information, graphic information, and so forth. The model trainer 504 may receive as input the collected data and uses a portion of the collected data as test data for an AI/ML algorithm to train the ML model 430. The model evaluator 506 may evaluate and improve the trained ML model 330 using a portion of the collected data as test data to test the ML model 430. The model evaluator 506 may also use feedback information from the deployed ML model 430. The model inferencer 508 may implement the trained ML model 430 to receive as input new unseen data, generate one or more inferences on the new data, and output a result such as an alert, a recommendation or other post-solution activity.

An exemplary AI/ML architecture for the ML components 510 is described in more detail with reference to FIG. 6.

FIG. 6 illustrates an artificial intelligence architecture 600 that may be used by the training device 514 to generate the ML model 430 (e.g., ML model(s) 206, as shown in FIG. 2) for deployment by the inferencing device 304. The artificial intelligence architecture 600 is an example of a system suitable for implementing various AI techniques and/or ML techniques to perform various inferencing tasks on behalf of the various devices of the system 100.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 600 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 430, evaluate performance of the trained ML model 430, and deploy the tested ML model 430 as the trained ML model 430 in a production environment, and continuously monitor and maintain it.

The ML model 430 may be a mathematical construct used to predict outcomes based on a set of input data. The ML model 430 may be trained using large volumes of training data 626, and it can recognize patterns and trends in the training data 626 to make accurate predictions. The ML model 430 may be derived from an ML algorithm 624 (e.g., a neural network, decision tree, support vector machine, etc.). A data set is fed into the ML algorithm 624 which trains an ML model 430 to "learn" a function that produces mappings between a set of inputs and a set of outputs with a reasonably high accuracy. Given a sufficiently large enough set of inputs and outputs, the ML algorithm 624 may find the function for a given task. This function may even be able to produce the correct output for input that it has not seen during training. A data scientist prepares the mappings, selects and tunes the ML algorithm 624, and evaluates the resulting model performance. Once the ML logic 428 is sufficiently accurate on test data, it can be deployed for production use.

The ML algorithm 624 may include any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 624 of the artificial intelligence architecture 600 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 6, the artificial intelligence architecture 600 includes a set of data sources 602 to source data 604 for the artificial intelligence architecture 600. Data sources 602 may comprise any device capable generating, processing, storing or managing data 604 suitable for a ML system. The data sources 602 may receive data 650 associated with documents (e.g., type of documents, portion(s) of document content(s) and/or entire contents of document(s), transactions data (e.g., type of transaction, transaction identifier, requests associated with the transaction, etc.), and/or any other data. It should be noted that the data 650 may also be supplied during training phase of the model. Some additional, non-limiting, examples of data sources 602 include without limitation databases, web scraping, sensors and Internet of Things (IoT) devices, image and video cameras, audio devices, text generators, publicly available databases, private databases, and many other data sources 602. The data sources 602 may be remote from the artificial intelligence architecture 600 and accessed via a network, local to the artificial intelligence architecture 600 an accessed via a network interface or may be a combination of local and remote data sources 602.

The data sources 602 source difference types of data 604 (which may include data 650 related to documents, transactions, etc.). By way of example and not limitation, the data 604 includes structured data from relational databases, such as customer profiles, transaction histories, or product inventories. The data 604 includes unstructured data from websites such as customer reviews, news articles, social media posts, or product specifications. The data 604 includes data from temperature sensors, motion detectors, and smart home appliances. The data 604 includes image data from medical images, security footage, or satellite images. The data 604 includes audio data from speech recognition, music recognition, or call centers. The data 604 includes text data from emails, chat logs, customer feedback, news articles or social media posts. The data 604 includes publicly available datasets such as those from government agencies, academic institutions, or research organizations. These are just a few examples of the many sources of data that can be used for ML systems. It is important to note that the quality and quantity of the data is critical for the success of a machine learning project.

The data 604 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 602 may be communicatively coupled to a data collector 502. The data collector 502 may gather relevant data 604 from the data sources 602. Once collected, the data collector 502 may use a pre-processor 606 to make the data 604 suitable for analysis. This may involve data cleaning, transformation, and feature engineering. Data pre-processing is a critical step in ML as it directly impacts the accuracy and effectiveness of the ML model 430. The pre-processor 606 receives the data 604 as input, processes the data 604, and outputs pre-processed data 616 for storage in a database 608. Examples for the database 608 includes a hard drive, solid state storage, and/or random-access memory (RAM).

The data collector 502 is communicatively coupled to a model trainer 504. The model trainer 504 may perform AI/ML model training, validation, and testing which may generate model performance metrics as part of the model testing procedure. The model trainer 504 may receive the pre-processed data 616 as input 610 or via the database 608. The model trainer 504 may implement a suitable ML algorithm 624 to train an ML model 430 on a set of training data 626 from the pre-processed data 616. The training process may involve feeding the pre-processed data 616 into the ML algorithm 624 to produce or optimize an ML model 430. The training process may adjust its parameters until it achieves an initial level of satisfactory performance.

The model trainer 504 may be communicatively coupled to a model evaluator 506. After an ML model 430 is trained, the ML model 430 may need to be evaluated to assess its performance. This is done using various metrics such as accuracy, precision, recall, and F1 score. The model trainer 504 may output the ML model 430, which is received as input 610 or from the database 608. The model evaluator 506 may receive the ML model 430 as input 612, and it initiates an evaluation process to measure performance of the ML model 430. The evaluation process may include providing feedback 618 to the model trainer 404. The model trainer 504 may re-train the ML model 430 to improve performance in an iterative manner.

The model evaluator 506 may be communicatively coupled to the model inferencer 508. The model inferencer 508 may provide AI/ML model inference output (e.g., inferences, predictions or decisions). Once the ML model 430 is trained and evaluated, it may be deployed in a production environment where it is used to make predictions on new data. The model inferencer 508 may receive the evaluated ML model 430 as input 614. The model inferencer 508 may use the evaluated ML model 430 to produce insights or predictions on real data, which may be deployed as a final production ML model 430. The inference output of the ML model 430 may be use case specific. The model inferencer 508 may also perform model monitoring and maintenance, which involves continuously monitoring per-formance of the ML model 430 in the production environ-ment and making any necessary updates or modifications to maintain its accuracy and effectiveness. The model infer-encer 508 may provide feedback 618 to the data collector 502 to train or re-train the ML model 430. The feedback 618 may include model performance feedback information, which may be used for monitoring and improving perfor-mance of the ML model 330.

Some or all of the model inferencer 408 may be imple-mented by various actors 622 in the artificial intelligence architecture 600, including the ML model 430 of the infer-encing device 404, for example. The actors 622 may use the deployed ML model 430 on new data to make inferences or predictions for a given task and output an insight 632. The actors 622 may implement the model inferencer 508 locally, or remotely receives outputs from the model inferencer 508 in a distributed computing manner. The actors 622 may trigger actions directed to other entities or to itself. The actors 622 provide feedback 620 to the data collector 502 via the model inferencer 408. The feedback 620 may include data needed to derive training data, inference data or to monitor the performance of the ML model 430 and its impact to the network through updating of key performance indicators (KPIs) and performance counters.

As discussed above, the systems 100, 400 implement some or all of the artificial intelligence architecture 600 to support various use cases and solutions for various AI/ML tasks. In some embodiments, the training device 514 of the apparatus 500 may use the artificial intelligence architecture 600 to generate and train the ML model 430 for use by the inferencing device 404 for the system 100. In one embodi-ment, for example, the training device 514 may train the ML model 430 as a neural network, as described in more detail with reference to FIG. 7. Other use cases and solutions for AI/ML are possible as well, and embodiments are not limited in this context.

Figure 7:
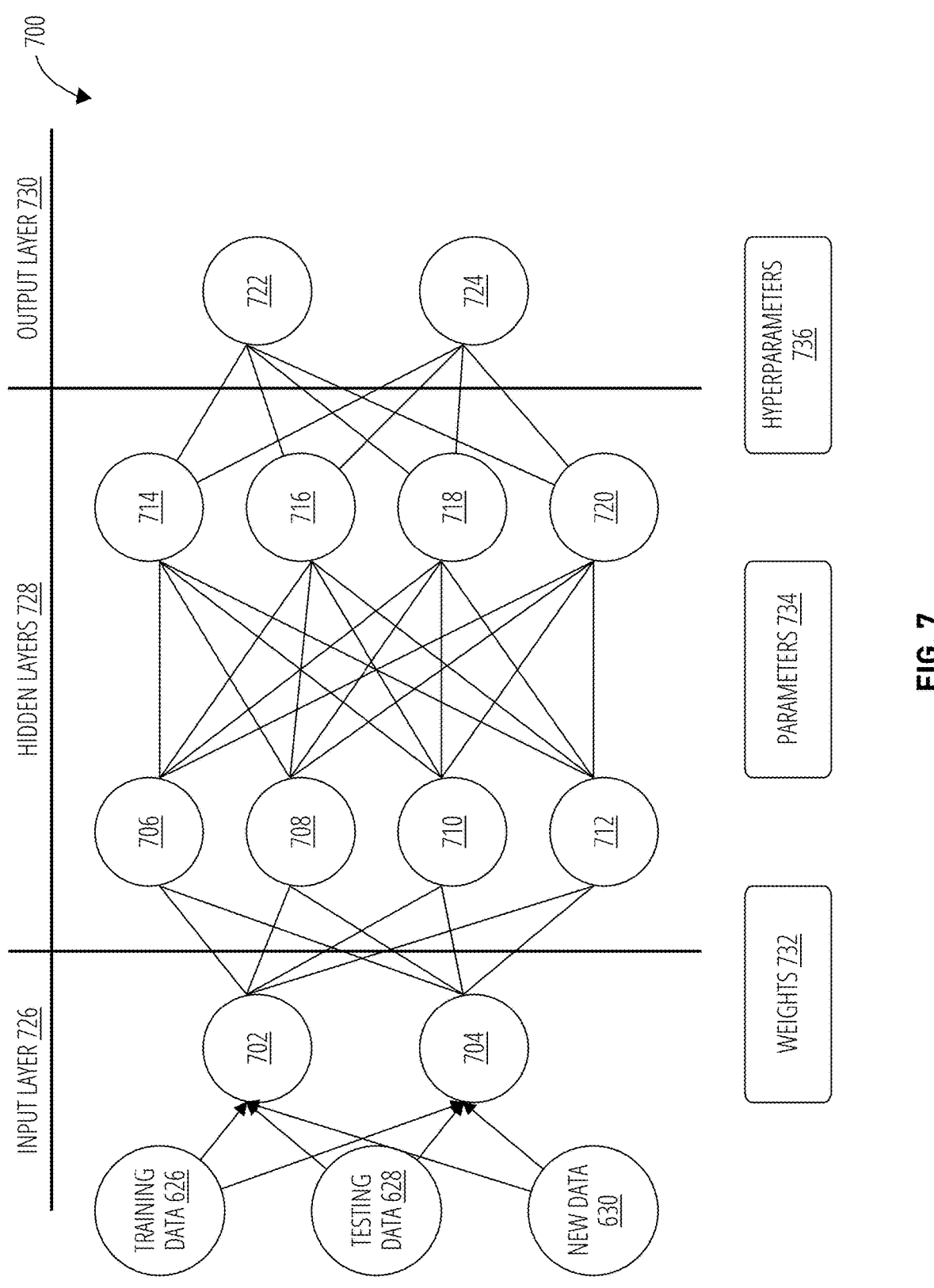
FIG. 7 illustrates an artificial neural network in accordance with one embodiment.

FIG. 7 illustrates an embodiment of an artificial neural network 700. Neural networks, also known as artificial neural networks (ANNs) or simulated neural networks (SNNs), are a subset of machine learning and are at the core of deep learning algorithms. Their name and structure are inspired by the human brain, mimicking the way that bio-logical neurons signal to one another.

Artificial neural network 700 may include multiple node layers, containing an input layer 726, one or more hidden layers 728, and an output layer 730. Each layer comprises one or more nodes, such as nodes 702 to 724. As shown in FIG. 7, for example, the input layer 726 may include nodes 702, 704. The artificial neural network 700 may include two hidden layers 728, with a first hidden layer having nodes 706, 708, 710 and 712, and a second hidden layer having nodes 714, 716, 718 and 720. The artificial neural network 700 may include an output layer 730 with nodes 722, 724. Each node 702 to 724 may include a processing element (PE), or artificial neuron, which connects to another and has an associated weight and threshold. If the output of any individual node is above the specified threshold value, that node may be activated, sending data to the next layer of the network. Otherwise, no data is passed along to the next layer of the network.

In general, artificial neural network 700 may rely on training data 626 to learn and improve accuracy over time. However, once the artificial neural network 700 may be fine-tuned for accuracy, and tested on testing data 628, the artificial neural network 700 may be ready to classify and cluster new data 630 at a high velocity. Tasks in speech recognition or image recognition can take minutes versus hours when compared to the manual identification by human experts.

Each individual node 702 to 424 may be a linear regres-sion model, composed of input data, weights, a bias (or threshold), and an output. The linear regression model may have a formula similar to Equation (1), as follows:

$$\sum wixi + \text{bias} = w1x1 + w2x2 + w3x3 + \text{bias output} = \quad \text{EQUATION (1)}$$

$$f(x) = 1 \text{ if } \sum w1x1 + b > = 0; 0 \text{ if } \sum w1x1 + b < 0$$

Once an input layer 726 is determined, a set of weights 732 may be assigned. The weights 732 help determine the importance of any given variable, with larger ones contrib-uting more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 700 as a feedforward network.

In some embodiments, the artificial neural network 700 may leverage sigmoid neurons, which are distinguished by having values between 0 and 1. Since the artificial neural network 700 behaves similarly to a decision tree, cascading data from one node to another, having x values between 0 and 1 will reduce the impact of any given change of a single variable on the output of any given node, and subsequently, the output of the artificial neural network 700.

The artificial neural network 700 may have many practical use cases, like image recognition, speech recognition, text recognition or classification. The artificial neural network 700 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Funcation} = MSE = \frac{1}{2m}\sum_{i=1}^{m}(\hat{y}_i - y_i)^2 \rightarrow \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 734 of the model adjust to gradually converge at the minimum.

In one embodiment, the artificial neural network 700 is feedforward, meaning it flows in one direction only, from input to output. In one embodiment, the artificial neural network 700 uses backpropagation. Backpropagation is when the artificial neural network 700 moves in the opposite direction from output to input. Backpropagation allows calculation and attribution of errors associated with each neuron 702 to 724, thereby allowing adjustment to fit the parameters 734 of the ML model 430 appropriately.

The artificial neural network 700 is implemented as different neural networks depending on a given task. Neural networks are classified into different types, which are used for different purposes. In one embodiment, the artificial neural network 700 is implemented as a feedforward neural network, or multi-layer perceptrons (MLPs), comprised of an input layer 726, hidden layers 728, and an output layer 730. While these neural networks are also commonly referred to as MLPs, they are actually comprised of sigmoid neurons, not perceptrons, as most real-world problems are nonlinear. Trained data 604 usually is fed into these models to train them, and they are the foundation for computer vision, natural language processing, and other neural networks. In one embodiment, the artificial neural network 700 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 700 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 700 is implemented as any type of neural network suitable for a given operational task of system 100, and the MLP, CNN, and RNN are merely a few examples. Embodiments are not limited in this context.

The artificial neural network 700 may include a set of associated parameters 734. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some embodiments, the artificial neural network 700 may be implemented as a deep learning neural network. The term deep learning neural network refers to a depth of layers in a given neural network. A neural network that has more than three layers-which would be inclusive of the inputs and the output—can be considered a deep learning algorithm. A neural network that only has two or three layers, however, may be referred to as a basic neural network. A deep learning neural network may tune and optimize one or more hyperparameters 736. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

FIG. 8 illustrates an example of a document corpus 808 suitable for use by the agreement renewal engine 150 of the server device 102. The document corpus 808 may be stored in one or more database and/or storage locations and may be accessible (e.g., via a query) by the agreement renewal engine 150. In general, a document corpus is a large and structured collection of electronic documents, such as text documents, which are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As shown in FIG. 8, the document corpus 808 may include information from electronic documents 818 derived from the document records 138 stored in the data store 126. The electronic documents 818 may include any electronic document having metadata such as STME 132 suitable for receiving an electronic signature, including both signed electronic documents or unsigned electronic documents. Different sets of the electronic documents 818 of the document corpus 808 may be associated with different entities. For example, a first set of electronic documents 818 is associated with a company A 802. A second set of electronic documents 818 is associated with a company B 804. A third set of electronic documents 818 is associated with a company C 806. A fourth set of electronic documents 818 is associated with a company D 810. Although some embodiments discuss the document corpus 808 having electronic documents 818, it may be appreciated that the document corpus 808 may have unsigned electronic document as well, which may be mined using the AI/ML techniques described herein. Embodiments are not limited in this context.

Each set of electronic documents 818 associated with a defined entity may include one or more subsets of the electronic documents 818 categorized by document type. For instance, the second set of electronic documents 818 associated with company B 804 may have a first subset of electronic documents 818 with a document type for supply agreements 812, a second subset of electronic documents 818 with a document type for lease agreements 816, and a third subset of electronic documents 818 with a document type for service agreements 814. In one embodiment, the sets and subsets of electronic documents 818 may be identified using labels manually assigned by a human operator, such as metadata added to a document record for a signed electronic document created in a document management system, or feedback from a user of the system 100 during a document generation process. In one embodiment, the sets and subsets of electronic documents 818 may be unlabeled.

Figure 9:
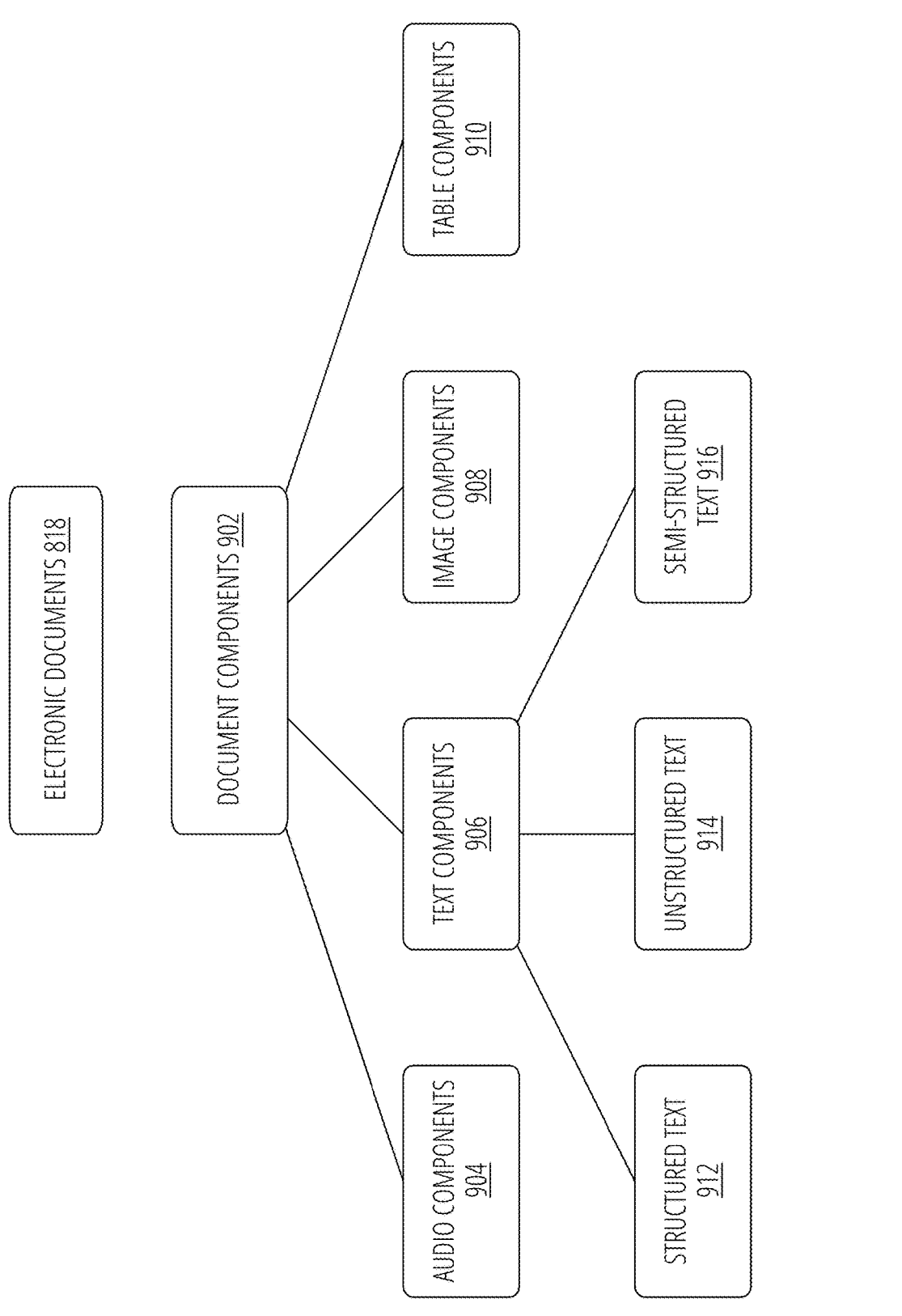
FIG. 9 illustrates electronic documents in accordance with one embodiment.

FIG. 9 illustrates an example of an electronic document 818. An electronic document 818 may include different information types that collectively form a set of document components 902 for the electronic document 818. The document components 902 may comprise, for example, one or more audio components 904, text components 906, image components 908, or table components 910. Each document component 902 may comprise different content types. For example, the text components 906 may comprise structured text 912, unstructured text 914, or semi-structured text 916.

Structured text 912 refers to text information that is organized in a specific format or schema, such as words, sentences, paragraphs, sections, clauses, and so forth. Structured text 912 has a well-defined set of rules that dictate how the data should be organized and represented, including the data types and relationships between data elements.

Unstructured text 914 refers to text information that does not have a predefined or organized format or schema. Unlike structured text 912, which is organized in a specific way, unstructured text 914 can take various forms, such as text information stored in a table, spreadsheet, figures, equations, header, footer, filename, metadata, and so forth.

Semi-structured text 916 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

Figure 10:
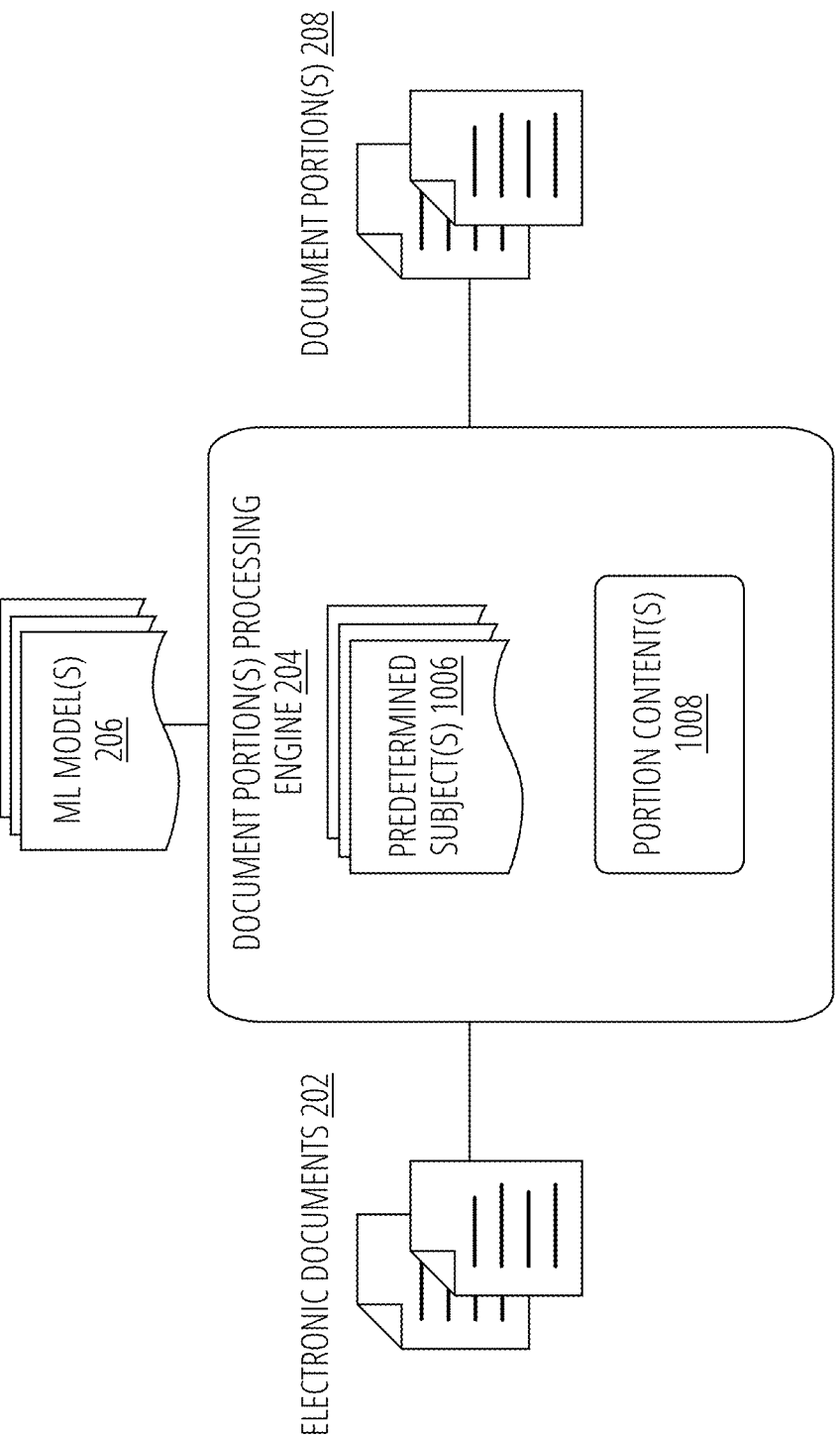
FIG. 10 illustrates an example operation of the document portion(s) processing engine, according to some embodiments of the current subject matter.

FIG. 10 illustrates an example operation of the document portion(s) processing engine 204, according to some embodiments of the current subject matter. The document portion(s) processing engine 204 may be configured to receive one or more electronic documents 202 and generate one or more document portion(s) 208. The document portion(s) 208 may be generated based on one or more predetermined subject(s) 1006 and/or analysis of one or more portion content(s) 1008 of one or more portions of the received document 202. In some example, non-limiting embodiments, the engine 204 may, optionally, be configured to execute processing of document(s) 202 based on a type of the document(s) 202 that may have been received. For example, the document(s) may be legal agreements of a particular type (e.g., evergreen contracts, auto-renewing contracts, etc.), non-legal agreement documents, and/or any other type of documents.

In some embodiments, for the purposes of identifying specific document portion(s) 208 of the document, the engine 204 may be configured to use one or more predetermined subject(s) 1006 (e.g., renewal, term, termination, etc.). The document portion(s) 208 may be identified based on their specific portion content(s) 1008 as they relates to the predetermined subject(s) 1006 (e.g., termination provisions of a sales agreement relate to term, renewal, etc. predetermined subject(s) 1006). Further, the document portion(s) processing engine 204 may also consider specific locations of document portion(s) 208 in the document. For example, "whereas" clause of an agreement appearing in the first few pages of the agreement may be considered by the engine 204 to determine presence of information related to renewal, term, etc. Alternatively, or in addition, specific context of the document and its elements may affect how engine 204 may select specific document portion(s) 208 from the document 202.

Moreover, to ascertain which document portion(s) 208 may need to be selected for identification of specific renewal terms, the document portion(s) processing engine 204 may be configured to use one or more ML model(s) 206. The ML model(s) 206 may be associated with a particular type of documents (e.g., sales agreement, lease agreement, employment application, government contract, computer program, etc.), a particular subject (e.g., renewal terms, termination clauses, pricing terms, executable functions in a computer code, etc.) that may be identified by the predetermined subject(s) 1006. The ML model(s) 206 may be trained using various historical data related to the electronic documents. The data in such data sets may be appropriate anonymized to remove any reference to private, non-public, personal, sensitive information, etc., if necessary. The training may rely on labeled data (e.g., a document having each element associated with a particular identifier or label), semi-labeled data, and/or unlabeled data. Moreover, the models may be re-trained and/or refresh trained based on feedback that may be received from users.

Once a particular ML model(s) 206 has been identified by the document portion(s) processing engine 204, the engine 204 may apply the identified model to the document 202 that has been received by the engine 204. The engine 204 then uses the identified ML model(s) 206 along with the predetermined subject(s) 1006 and portion content(s) 1008 to identify specific document portion(s) 208. As can be understood, the document portion(s) 208 may be generated based any other factors, and/or any combinations thereof. The identified document portion(s) 208 may be outputted by the engine 204 and provided to the query processing engine 210 for further processing.

FIG. 11 illustrates further details of operation of the document portion(s) processing engine 204, according to some embodiments of the current subject matter. As shown in FIG. 11, a document 1102 (which may be part of electronic documents 202) may be provided to the document portion(s) processing engine 204 for generation of one or more document portion(s) 208. As stated above, the engine 204 may, optionally, determined the type of the document 1102 for further processing (e.g., determination and/or tracking of renewals of specific types of agreements, etc.).

The document 1102 may be an agreement, e.g., a master services agreement, which may include a plurality of clauses. For example, clause 1 may identify parties to the agreement, clause 2 may describe terms and conditions of the agreement, . . . clause M may be a termination clause that may also describe renewal terms of the agreement. The document portion(s) processing engine 204 may be configured to use one or more ML model(s) 206 (not shown in FIG. 11) to analyze the document 1102 and determine which clauses in the agreement may be relevant to a particular predetermined subject(s) 1006, e.g., renewal. In particular, the engine 204 may be configured to conduct various searches (e.g., semantic searches) of the document 1102 for the renewal subject 1006.

Searching the document 1102, using the ML model(s) 206, the engine 204 may discover that clause M may include text that may be relevant to renewal. In that regard, the engine 204 may extract one or more document portions 1106a, 1106b, . . . 1106c that may be relevant to renewal. For example, document portion 1 1106a may state "term of this agreement is 1 year from the date of signing", document portion 2 1106b may state "this agreement can be renewed for another term of 1 year", and document portion n 1106c may state "this agreement must be renewed within the renewal period of 15 days prior to the termination date." These portions may be extracted from clause M of the agreement document 1102 and/or from any other clauses within the agreement document 1102.

As discussed herein, the ML model(s) 206 may be trained to determine which clauses of the agreement document 1102 may contain text that may be relevant to the predetermined subject(s) 1006. For example, the ML model(s) 206 may be trained using one or more historical master service agreements that may include similar document portions. The data in such historical master service agreements may be appropriate anonymized to remove any sensitive information, if necessary.

FIG. 12 illustrates an example operation of the query processing engine 210, according to some embodiments of the current subject matter. As discussed herein, the query processing engine 210 may be configured to receive one or more document portion(s) 208 (e.g., portions 1106a, 1106b, . . . 1106c, etc.) and generate one or more queries to the generative AI model(s) 214 to determine values that may need to be assigned to specific attributes defined by one or more attribute definitions 212.

As shown in FIG. 12, the attribute definitions 212 may include one or more attribute definitions 1202a, 1202b, . . . 1202c. Each attribute definition may define specific attributes, where attributes may be associated with a particular predetermined subject(s) 1006. If the predetermined subject(s) 1006 is renewal of an agreement, then attribute definitions 212 may include definitions of attributes related to renewal. For instance, attribute definition 1 1202a may define an attribute "agreement term", which may be defined as a length of time during which an agreement is enforceable or defined in any other manner; attribute definition 2 1202b may define an attribute "renewal term", which may be defined as a length of time for which an agreement can be renewed or defined in any other manner; and attribute definition N 1202c may define an attribute "renewal period", which may be defined as a length of time during which an agreement may be renewed or defined in any other manner. In some embodiments, definitions of attributes may be predetermined and/or provided to the query processing engine 210. Alternatively, or in addition, the definitions of attributes may be determined from one or more analyses of historical documents (e.g., agreements of a particular type, and/or any agreements). The analyses may be and/or have been performed by one or more machine learning models, e.g., ML model(s) 206 and/or generative AI model(s) 214.

The definitions of attributes 1202a, 1202b, . . . 1202c, document portion(s) 208, and/or the document 1102 may then be provided to a query generator 1204. The query generator 1204 may be configured to generate a query 1206 to generative AI model(s) 214. The query 1206 may be a natural language query, e.g., "provide renewal terms of the agreement with ABC Company". As can be understood, the query 1206 may be any type of query. The generative AI model(s) 214 may be configured to analyze the document portion(s) 208 and determine one or more values for each of the provided attributes as defined by one or more definitions 1202a, 1202b, . . . 1202c, as shown in FIG. 13.

Figure 13:
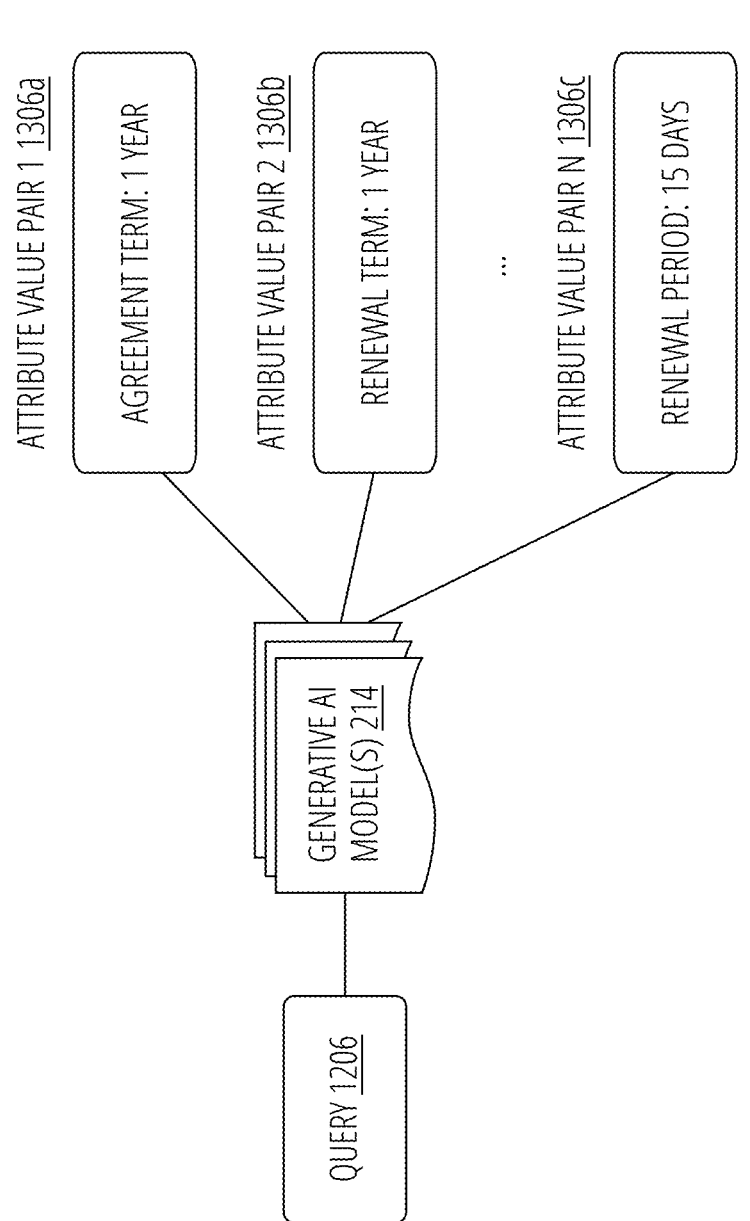
FIG. 13 illustrates an example operation of the generative AI model(s) in generating one or more attribute value pairs, according to some embodiments of the current subject matter.

FIG. 13 illustrates an example operation of the generative AI model(s) 214 in generating one or more attribute value pairs, according to some embodiments of the current subject matter. The generative AI model(s) 214 may be provided with query 1206 that may be generated by the query processing engine 210. As stated above, the query 1206 may include attribute definitions 1202a, 1202b, . . . 1202c, one or more document portions 1106a, 1106b, . . . 1106c, and/or document 1102. The generative AI model(s) 214 may be configured to ingest the information along with the query 1206 and generate one or more attribute value pairs 1306a, 1306b, . . . 1306c.

The generative AI model(s) 214 may be trained using one or more prompts, historical datasets (e.g., agreements with renewal terms, etc.), datasets having labeled objects (e.g., labeled clauses, sentences, paragraphs, etc. related to termination), etc. The data in the training datasets may include any data that has been previously identified, e.g., as renewal attributes and values, etc. The data in the training datasets may also include data resulted from executions of processes by the agreement renewal engine 150, where the data may be appropriately anonymized, if necessary. The generative AI model(s) 214 may be part of the engine 150 and/or be one or more third party models, including, but not limited to, any artificial intelligence generative models, e.g., ChatGPT, Bard, DALL-E, Midjourney, DeepMind, etc., and may be accessed by the query processing engine 210.

As shown in FIG. 13, the generative AI model(s) 214 may be configured to generate attribute value pair 1 1306a, which may indicate that the attribute "Agreement Term" may be assigned a value "1 year" as a result of the operations performed by the generative AI model(s) 214, e.g., analysis of document 1102, and in particular document portion 1 1106a, using attribute definition 1 1202a. Further, the model 214 may generate attribute value pair 2 1306b, which may indicate that the attribute "Renewal Term" may be assigned a value "1 year" based on the processing performed by the generative AI model(s) 214, e.g., analysis of document portion 2 1106*b* using attribute definition 2 1202*b*. Similarly, the generative AI model(s) 214 may generate attribute value pair N 1306*c*, which may indicate that the attribute "Renewal Period" may be assigned a value of "15 days" based on the analysis of document portion n 1106*c* using attribute definition N 1202*c* by the generative AI model(s) 214. While the values in the attribute value pairs 1306 all include time values, as can be understood, the values may be determined and assigned by the generative AI model(s) 214 based on the specific query 1206, document portion(s) 208, attribute definitions 212, and/or any other factors.

In some embodiments, once the attribute value pairs 1306 are generated by the generative AI model(s) 214 and provided to the query processing engine 210, the agreement renewal engine 150 may be configured to execute one or more post-processing operations. These may include, but not limited resolving any conflicts, hallucinations, etc. that may have occurred during operation of the engine 210 using generative AI model(s) 214 (e.g., conflicting renewal periods (e.g., renewal period within 10,000 days of the agreement termination), provision of a renewal term that is inconsistent with the term of the agreement (e.g., 1000 year renewal term vs. 1 year term of the agreement). Such post-processing operations may be performed by re-execution of one or more processes performed by document portion(s) processing engine 204 and/or query processing engine 210. Alternatively, or in addition, post-processing operations may be performed manually.

The agreement renewal engine 150 may provide generated attribute value pairs 1306 to the user device 216 for displaying on a graphical user interface. The attribute value pairs 1306 may be displayed as interactive menu items, tables, charts, graphs, etc. on a webpage, a mobile application, etc. In some embodiments, a user may use the user device 216 to provide feedback to the agreement renewal engine 150. The feedback may also be in response to one or more attribute value pairs 1306, one or more identified document portion(s) 208, one or more attribute definitions 212, one or more queries provided to generative AI model(s) 214, and/or any other feedback. The feedback may be part of the post-processing operations. The feedback may be any type of feedback, e.g., a yes/no vote, thumbs up, thumbs down, etc. It may indicate user's acceptance of and/or satisfaction with one or more attribute value pairs 1306, identified document portion(s) 208, attribute definitions 212, queries to generative AI model(s) 214, etc. The feedback may be textual feedback that may include specific comments that may be written and sent to the agreement renewal engine 150 by the user using the user device 216. As can be understood, any other type of feedback may be provided.

The engine 150 may use the feedback to update the attribute value pairs 1306, the identified document portion(s) 208, the attribute definitions 212, the queries to generative AI model(s) 214, etc. The engine 150 may also identify different ML model(s) 206 and/or generative AI model(s) 214 to determine attribute value pairs 1306, document portion(s) 208, attribute definitions 212, queries to generative AI model(s) 214, etc., update existing ML model(s) 206 and/or generative AI model(s) 214, etc. Using the feedback, the engine 150 may generate one or more updated attribute value pairs 1306, document portion(s) 208, attribute definitions 212, queries to generative AI model(s) 214, etc. As can be understood, any other actions may be performed by the engine 150 based on the feedback. The engine 150 may train, re-train, refresh-train and/or create new ML model(s) 206 and/or generative AI model(s) 214. Feedback may be used to update any of the above operations and/or how any of them are performed. This process may continue until the user has no further feedback.

In some embodiments, the attribute value pairs 1306, the document portion(s) 208, attribute definitions 212, the queries to generative AI model(s) 214, etc. may be stored in the data storage location 218. For example, a data storage object may be generated that may include the attribute value pairs 1306, the document 1102, the document portion(s) 208, the attribute definitions 212, the queries to generative AI model (s) 214, etc. The data storage object stored in the data storage location 218 and may include any relevant metadata associated with one or more of the above. The data storage object may, for example, be retrieved for training of one or more ML model(s) 206 and/or generative AI model(s) 214 as well as for any other purposes.

FIG. 14 illustrates an example method 1400 for identifying one or more renewal terms (and/or any other terms) in an agreement, according to some embodiments of the current subject matter. The method 1400 may be executed using system 100 shown in FIG. 1, and in particular using the agreement renewal engine 150.

At 1402, the agreement renewal engine 150 may generate, using a first machine learning model (e.g., ML model(s) 206), one or more portions (e.g., document portion 1 1106*a*, document portion 2 1106*b*, . . . , document portion n 1106*c*) of a document (e.g., document 1102). Each portion 1106 of the document 1102 may be associated with a predetermined subject (e.g., predetermined subject(s) 1006).

At 1404, the engine 150 may generate a query (e.g., query 1206) using the predetermined subject. In some embodiments, the query processing engine 210 may be configured to generate the query 1206 using document portion(s) 1106 and one or more attribute definitions 1202 (e.g., attribute definition 1 1202*a*, attribute definition 2 1202*b*, . . . attribute definition N 1202*c*). The query may be a natural language query and may also include the document 1102 and/or any further instructions to the generative AI model(s) 214 for generation of attribute value pairs 1306.

At 1406, the agreement renewal engine 150 may provide the query 1206 and one or more definitions 1202 of one or more attributes to a second machine learning model, e.g., generative AI model(s) 214.

At 1408, the engine 150 may be configured to receive, from the second machine learning model (e.g., generative AI model(s) 214), at least one attribute (e.g., "renewal term", etc.) and a value assigned to that attribute (e.g., attribute value pair 1 1306*a*, attribute value pair 2 1306*b*, . . . , attribute value pair N 1306*c*). The value may be extracted from one or more portions (e.g., document portion 1 1106*a*, document portion 2 1106*b*, . . . document portion n 1106*c*) and assigned to that attribute.

At 1410, the engine 150 may generate a graphical user interface displaying the attribute(s) and the value(s) assigned to the respective attribute(s). The graphical user interface may be displayed by the user device 216.

FIG. 15 illustrates another example method 1500 for identifying one or more renewal terms (and/or any other terms) in an agreement, according to some embodiments of the current subject matter. The method 1500 may be executed using the agreement renewal engine 150.

At 1502, the agreement renewal engine 150 may receive a document (e.g., document 1102) having a plurality of portions. The document 1102 may be received, retrieved, etc. from data storage location 218 and/or document storage location(s) 304.

At 1504, the document portion(s) processing engine 204 of the agreement renewal engine 150 may extract, using a first machine learning model (e.g., ML model(s) 206), one or more document portion(s) 208 in the plurality of portions from the document. Each portion may be associated with a predetermined subject (e.g., predetermined subject(s) 1006).

At 1506, the query processing engine 210 of the agreement renewal engine 150 may provide a query (e.g., query 1206) and one or more definitions (e.g., attribute definition 1 1202*a*, attribute definition 2 1202*b*, . . . attribute definition N 1202*c*) of one or more attributes (e.g., "Agreement Term", "Renewal Term", etc.) associated with the predetermined subject to a second machine learning model (e.g., generative AI model(s) 214).

At 1508, the agreement renewal engine 150 may receive, from the second machine learning model, at least one attribute and a value assigned to that attribute (e.g., attribute value pair 1 1306*a*, 1306*b*, . . . , attribute value pair N 1306*c*). The value may be determined from the portions 1106 and assigned to the attribute.

At 1510, the engine 150 may generate a graphical user interface displaying (e.g., by the user device 216) the attribute and the value assigned to that attribute.

FIG. 16 illustrates yet another example method 1600 for identifying one or more renewal terms (and/or any other terms) in an agreement, according to some embodiments of the current subject matter. The method 1600 may also be executed using the agreement renewal engine 150.

At 1602, the agreement renewal engine 150 may extract, using a first machine learning model (e.g., ML model(s) 206), one or more portions (e.g., document portion(s) 208) in the plurality of portions from a document (e.g., document 1102). Each portion may be associated with a predetermined subject (e.g., predetermined subject(s) 1006). The document may be an agreement document having a predetermined expiration date and the predetermined subject may be associated with a renewal of the agreement document.

At 1604, the agreement renewal engine 150 may provide a query (e.g., query 1206) and one or more definitions (e.g., definitions 1202) of one or more attributes (e.g., "Renewal Term", "Agreement Term") associated with the predetermined subject to a second machine learning model (e.g., generative AI model(s) 214).

At 1606, the engine 150 may receive, from the second machine learning model, at least one attribute and a value assigned to that attribute (e.g., attribute value pairs 1306). The value may be determined from one or more portions (e.g., portions 1106) and assigned to the attribute.

At 1608, the engine 150 may generate a graphical user interface displaying the attribute and the value assigned to the attribute.

Figure 17:
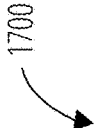
FIG. 17 illustrates a computer-readable storage medium in accordance with one embodiment.

FIG. 17 illustrates an apparatus 1700. Apparatus 1700 may comprise any non-transitory computer-readable storage medium 1702 or machine-readable storage medium, such as an optical, magnetic or semiconductor storage medium. In various embodiments, apparatus 1700 may comprise an article of manufacture or a product. In some embodiments, the computer-readable storage medium 1702 may store computer executable instructions with which circuitry can execute. For example, computer executable instructions 1704 can include instructions to implement operations described with respect to any logic flows described herein. Examples of computer-readable storage medium 1702 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1704 may include any suitable type of code, such as source code, compiled code, interpreted code, executable code, static code, dynamic code, object-oriented code, visual code, and the like.

FIG. 18 illustrates an embodiment of a computing architecture 1800. Computing architecture 1800 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1800 may have a single processor with one core or more than one processor. Note that the term "processor" refers to a processor with a single core or a processor package with multiple processor cores. In at least one embodiment, the computing architecture 1800 is representative of the components of the system 100. More generally, the computing architecture 1800 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 18, computing architecture 1800 comprises a system-on-chip (SoC) 1802 for mounting platform components. System-on-chip (SoC) 1802 is a point-to-point (P2P) interconnect platform that includes a first processor 1804 and a second processor 1806 coupled via a point-to-point interconnect 1870 such as an Ultra Path Interconnect (UPI). In other embodiments, the computing architecture 1800 may be of another bus architecture, such as a multidrop bus. Furthermore, each of processor 1804 and processor 1806 may be processor packages with multiple processor cores including core(s) 1808 and core(s) 1810, respectively. While the computing architecture 1800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 1804 and chipset 1832. Some platforms may include additional components and some platforms may only include sockets to mount the processors and/or the chipset. Furthermore, some platforms may not have sockets (e.g., SoC, or the like). Although depicted as a SoC 1802, one or more of the components of the SoC 1802 may also be included in a single die package, a multi-chip module (MCM), a multi-die package, a chiplet, a bridge, and/or an interposer. Therefore, embodiments are not limited to a SoC.

The processor 1804 and processor 1806 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 1804 and/or processor 1806. Additionally, the processor 1804 need not be identical to processor 1806.

Processor 1804 includes an integrated memory controller (IMC) 1820 and point-to-point (P2P) interface 1824 and P2P interface 1828. Similarly, the processor 1806 includes an IMC 1822 as well as P2P interface 1826 and P2P interface 1830. IMC 1820 and IMC 1822 couple the processor 1804 and processor 1806, respectively, to respective memories (e.g., memory 1816 and memory 1818). Memory 1816 and memory 1818 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 1816 and the memory 1818 locally attach to the respective processors (i.e., processor 1804 and processor 1806). In other embodiments, the main memory may couple with the processors via a bus and shared memory hub. Processor 1804 includes registers 1812 and processor 1806 includes registers 1814.

Computing architecture 1800 includes chipset 1832 coupled to processor 1804 and processor 1806. Furthermore, chipset 1832 can be coupled to storage device 1850, for example, via an interface (I/F) 1838. The I/F 1838 may be, for example, a Peripheral Component Interconnect-enhanced (PCIe) interface, a Compute Express Link® (CXL) interface, or a Universal Chiplet Interconnect Express (UCIe) interface. Storage device 1850 can store instructions executable by circuitry of computing architecture 1800 (e.g., processor 1804, processor 1806, GPU 1848, accelerator 1854, vision processing unit 1856, or the like). For example, storage device 1850 can store instructions for server device 102, client devices 112, client devices 116, or the like.

Processor 1804 couples to the chipset 1832 via P2P interface 1828 and P2P interface 1834 while processor 1806 couples to the chipset 1832 via P2P interface 1830 and P2P interface 1836. Direct media interface (DMI) 1876 and DMI 1878 may couple the P2P interface 1828 and the P2P 1834 and the P2P interface 1830 and P2P 1836, respectively. DMI 1876 and DMI 1878 may be a high-speed interconnect that facilitates, e.g., eight Giga Transfers per second (GT/s) such as DMI 3.0. In other embodiments, the processor 1804 and processor 1806 may interconnect via a bus.

The chipset 1832 may comprise a controller hub such as a platform controller hub (PCH). The chipset 1832 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1832 may comprise more than one controller hub such as a chipset with a memory controller hub, a graphics controller hub, and an input/output (I/O) controller hub.

In the depicted example, chipset 1832 couples with a trusted platform module (TPM) 1844 and UEFI, BIOS, FLASH circuitry 1846 via I/F 1842. The TPM 1844 is a dedicated microcontroller designed to secure hardware by integrating cryptographic keys into devices. The UEFI, BIOS, FLASH circuitry 1846 may provide pre-boot code. The I/F 1842 may also be coupled to a network interface circuit (NIC) 1880 for connections off-chip.

Furthermore, chipset 1832 includes the I/F 1838 to couple chipset 1832 with a high-performance graphics engine, such as, graphics processing circuitry or a graphics processing unit (GPU) 1848. In other embodiments, the computing architecture 1800 may include a flexible display interface (FDI) (not shown) between the processor 1804 and/or the processor 1806 and the chipset 1832. The FDI interconnects a graphics processor core in one or more of processor 1804 and/or processor 1806 with the chipset 1832.

The computing architecture 1800 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 1854 and/or vision processing unit 1856 can be coupled to chipset 1832 via I/F 1838. The accelerator 1854 is representative of any type of accelerator device (e.g., a data streaming accelerator, cryptographic accelerator, cryptographic co-processor, an offload engine, etc.). One example of an accelerator 1854 is the Intel® Data Streaming Accelerator (DSA). The accelerator 1854 may be a device including circuitry to accelerate copy operations, data encryption, hash value computation, data comparison operations (including comparison of data in memory 1816 and/or memory 1818), and/or data compression. For example, the accelerator 1854 may be a USB device, PCI device, PCIe device, CXL device, UCIe device, and/or an SPI device. The accelerator 1854 can also include circuitry arranged to execute machine learning (ML) related operations (e.g., training, inference, etc.) for ML models. Generally, the accelerator 1854 may be specially designed to perform computationally intensive operations, such as hash value computations, comparison operations, cryptographic operations, and/or compression operations, in a manner that is more efficient than when performed by the processor 1804 or processor 1806. Because the load of the computing architecture 1800 may include hash value computations, comparison operations, cryptographic operations, and/or compression operations, the accelerator 1854 can greatly increase performance of the computing architecture 1800 for these operations.

The accelerator 1854 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 1854. For example, the accelerator 1854 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1854 via a non-posted write (e.g., a deferred memory write (DMWr)). One example of an instruction that atomically submits a work descriptor to the shared work queue of the accelerator 1854 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1854. The dedicated work queue may accept job submissions via commands such as the movdir64b instruction.

Various I/O devices 1860 and display 1852 couple to the bus 1872, along with a bus bridge 1858 which couples the bus 1872 to a second bus 1874 and an I/F 1840 that connects the bus 1872 with the chipset 1832. In one embodiment, the second bus 1874 may be a low pin count (LPC) bus. Various devices may couple to the second bus 1874 including, for example, a keyboard 1862, a mouse 1864 and communication devices 1866.

Furthermore, an audio I/O 1868 may couple to second bus 1874. Many of the I/O devices 1860 and communication devices 1866 may reside on the system-on-chip (SoC) 1802 while the keyboard 1862 and the mouse 1864 may be add-on peripherals. In other embodiments, some or all the I/O devices 1860 and communication devices 1866 are add-on peripherals and do not reside on the system-on-chip (SoC) 1802.

FIG. 19 illustrates a block diagram of an exemplary communications architecture 1900 suitable for implementing various embodiments as previously described. The communications architecture 1900 includes various common communications elements, such as a transmitter, receiver, transceiver, radio, network interface, baseband processor, antenna, amplifiers, filters, power supplies, and so forth. The embodiments, however, are not limited to implementation by the communications architecture 1900.

As shown in FIG. 19, the communications architecture 1900 includes one or more clients 1902 and servers 1904. The clients 1902 may implement a client version of the server device 102, for example. The servers 1904 may implement a server version of the server device 102, for example. The clients 1902 and the servers 1904 are operatively connected to one or more respective client data stores 1908 and server data stores 1910 that can be employed to store information local to the respective clients 1902 and servers 1904, such as cookies and/or associated contextual information.

The clients 1902 and the servers 1904 may communicate information between each other using a communication framework 1906. The communications communication framework 1906 may implement any well-known communications techniques and protocols. The communications communication framework 1906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

(117) The communication framework 1906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1902 and the servers 1904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus.

Various general-purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-20 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

The following examples pertain to further embodiments, from which numerous permutations and configurations will be apparent.

In one aspect, a computer-implemented method may include generating, using at least one processor, using a first machine learning model, one or more portions of a document, each portion in the one or more portions of the document being associated with a predetermined subject; generating, using the at least one processor, a query using the predetermined subject; providing, using the at least one processor, the query and one or more definitions of one or more attributes to a second machine learning model; receiving, using the at least one processor, from the second machine learning model, at least one attribute in the one or more attributes and a value assigned to the at least one attribute, wherein the value is extracted from the one or more portions and assigned to the at least one attribute; and generating, using the at least one processor, a graphical user interface displaying the at least one attribute and the value assigned to the at least one attribute.

The method may include wherein the query is a natural language representation query.

The method may include wherein the document includes at least one of the following: a legal document, a non-legal document, and any combinations thereof.

The method may include wherein the one or more portions include at least one of the following: a page in the document, a clause in the document, a paragraph in the document, a sentence in the document, a phrase in the document, a text in the document, and any combination thereof.

The method may include wherein the one or more portions include at least one of the following: a text, an audio, a video, an image, a table, and any combination thereof.

The method may include wherein at least one of the first and second machine learning models includes at least one of the following: a large language model, at least one generative artificial intelligence model, and any combination thereof.

The method may include wherein the document is an agreement document having a predetermined expiration date and the predetermined subject is associated with a renewal of the agreement document.

The method may include wherein the at least one attribute includes at least one of the following: a renewal term of the agreement, a renewal notice period of the agreement, a term of the agreement, and any combination thereof.

The method may include wherein the value assigned to the at least one attribute includes time.

In one aspect, a system may include at least one processor; and at least one memory storing instructions that, when executed by the at least one processor, cause the at least one processor to: receive a document having a plurality of portions; extract, using a first machine learning model, one or more portions in the plurality of portions from the document, each portion in the one or more portions is associated with a predetermined subject; provide a query and one or more definitions of one or more attributes associated with the predetermined subject to a second machine learning model; receive, from the second machine learning model, at least one attribute in the one or more attributes and a value assigned to the at least one attribute, wherein the value is determined from the one or more portions and assigned to the at least one attribute; and generate a graphical user interface displaying the at least one attribute and the value assigned to the at least one attribute.

The system may include wherein the query is a natural language representation query.

The system may include wherein the document includes at least one of the following: a legal document, a non-legal document, and any combinations thereof.

The system may include wherein the one or more portions include at least one of the following: a page in the document, a clause in the document, a paragraph in the document, a sentence in the document, a phrase in the document, a text in the document, and any combination thereof.

The system may include wherein the one or more portions include at least one of the following: a text, an audio, a video, an image, a table, and any combination thereof.

The system may include wherein at least one of the first and second machine learning models includes at least one of the following: a large language model, at least one generative artificial intelligence model, and any combination thereof.

The system may include wherein the document is an agreement document having a predetermined expiration date and the predetermined subject is associated with a renewal of the agreement document.

The system may include wherein the at least one attribute includes at least one of the following: a renewal term of the agreement document, a renewal notice period of the agreement document, a term of the agreement document, and any combination thereof.

The system may include wherein the value assigned to the at least one attribute includes time.

In one aspect, a non-transitory computer-readable storage medium, the computer-readable storage medium including instructions that when executed by at least one processor, cause the at least one processor to: extract, using a first machine learning model, one or more portions in the plurality of portions from a document, each portion in the one or more portions is associated with a predetermined subject, wherein the document is an agreement document having a predetermined expiration date and the predetermined subject is associated with a renewal of the agreement document; provide a query and one or more definitions of one or more attributes associated with the predetermined subject to a second machine learning model; receive, from the second machine learning model, at least one attribute in the one or more attributes and a value assigned to the at least one attribute, wherein the value is determined from the one or more portions and assigned to the at least one attribute; and generate a graphical user interface displaying the at least one attribute and the value assigned to the at least one attribute.

The computer-readable storage medium may include wherein the at least one attribute includes at least one of the following: a renewal term of the agreement document, a renewal notice period of the agreement document, a term of the agreement document, and any combination thereof; wherein the value assigned to the at least one attribute includes time.

Any of the computing apparatus examples given above may also be implemented as means plus function examples. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of stream-lining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifica-tions and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computer-implemented method, comprising:

selecting, using at least one processor, a first machine learning model from a plurality of first machine learn-ing models based on receiving a task associated with an electronic document, the first machine learning model has been trained to perform the task;

applying, using the at least one processor, the selected first machine learning model to the electronic document to extract one or more portions from the electronic docu-ment, each portion in the one or more portions of the electronic document is associated with a predetermined subject;

generating, using the at least one processor, a query using the predetermined subject;

providing, using the at least one processor, the query and one or more definitions of one or more attributes to a second machine learning model;

receiving, using the at least one processor, from the second machine learning model, at least one attribute in the one or more attributes and a value assigned to the at least one attribute, wherein the value is extracted from the one or more portions and assigned to the at least one attribute; and generating, using the at least one processor, a graphical user interface displaying the at least one attribute and the value assigned to the at least one attribute.

2. The method of claim 1, wherein the query is a natural language representation query.

3. The method of claim 1, wherein the electronic docu-ment includes at least one of the following: a legal docu-ment, a non-legal document, and any combinations thereof.

4. The method of claim 3, wherein the one or more portions include at least one of the following: a page in the electronic document, a clause in the electronic document, a paragraph in the electronic document, a sentence in the electronic document, a phrase in the electronic document, a text in the electronic document, and any combination thereof.

5. The method of claim 1, wherein the one or more portions include at least one of the following: a text, an audio, a video, an image, a table, and any combination thereof.

6. The method of claim 1, wherein at least one of the first and second machine learning models includes at least one of the following: a large language model, at least one genera-tive artificial intelligence model, and any combination thereof.

7. The method of claim 1, wherein the electronic docu-ment is an electronic agreement document having a prede-termined expiration date and the predetermined subject is associated with a renewal of the electronic agreement docu-ment.

8. The method of claim 7, wherein the at least one attribute includes at least one of the following: a renewal term of the electronic agreement document, a renewal notice period of the electronic agreement document, a term of the electronic agreement document, and any combination thereof.

9. The method of claim 8, wherein the value assigned to the at least one attribute includes time.

\* \* \* \* \*